US011496610B2

(12) United States Patent
Torres et al.

(10) Patent No.: US 11,496,610 B2
(45) Date of Patent: Nov. 8, 2022

(54) NETWORK MANAGEMENT DATA TRANSLATION, QUERYING, AND DISCREPANCY DETECTION

(71) Applicant: Verizon Patent and Licensing Inc., Basking Ridge, NJ (US)

(72) Inventors: Randolph Torres, Clermont, FL (US); William J. Moran, Wesley Chapel, FL (US); Michael T. Bayne, Wesley Chapel, FL (US); Srinivasu Narumanchi, Allen, TX (US); Syed Raza, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 34 days.

(21) Appl. No.: 16/913,243

(22) Filed: Jun. 26, 2020

(65) Prior Publication Data
US 2021/0409520 A1 Dec. 30, 2021

(51) Int. Cl.
*H04L 29/06* (2006.01)
*H04L 12/24* (2006.01)
*H04L 12/26* (2006.01)
*H04L 69/08* (2022.01)
*H04L 41/12* (2022.01)
*H04L 41/0803* (2022.01)
*H04L 43/50* (2022.01)
*H04L 69/22* (2022.01)
*H04L 69/18* (2022.01)

(52) U.S. Cl.
CPC .......... *H04L 69/08* (2013.01); *H04L 41/0803* (2013.01); *H04L 41/12* (2013.01); *H04L 43/50* (2013.01); *H04L 69/18* (2013.01); *H04L 69/22* (2013.01)

(58) Field of Classification Search
CPC ..... H04L 69/08; H04L 41/0803; H04L 41/12; H04L 43/50; H04L 69/18; H04L 69/22
USPC .......................................................... 709/230
See application file for complete search history.

(56) References Cited

U.S. PATENT DOCUMENTS

| 7,404,000 | B2 * | 7/2008 | Lolayekar | H04L 67/1097 |
| | | | | 709/250 |
| 10,382,389 | B2 * | 8/2019 | Meixler | H04L 61/4555 |
| 10,735,270 | B1 * | 8/2020 | Whipple | H04L 45/02 |
| 11,201,955 | B1 * | 12/2021 | Sachdeva | H04L 69/22 |
| 2009/0327903 | A1 * | 12/2009 | Smith | H04L 43/50 |
| | | | | 715/737 |
| 2016/0314202 | A1 * | 10/2016 | Gomadam | G06F 16/353 |
| 2017/0195171 | A1 * | 7/2017 | Wohlert | H04L 41/0803 |
| 2017/0235785 | A1 * | 8/2017 | Feltham | G06F 16/248 |
| | | | | 707/690 |

(Continued)

*Primary Examiner* — Schquita D Goodwin

(57) ABSTRACT

A network device receives a first configuration management message from a first network element, where the first configuration management message has a first data format. The network device translates the first configuration management message from the first data format to a Common Network Data (CND) model format to produce a first translated message, where the CND model format comprises a graph schema based on nodes, edges, and properties to represent and store configuration management message data. The network device stores the first translated message in a CND model format data structure for subsequent use in message querying, message comparison, message anomaly detection, or message discrepancy detection.

20 Claims, 17 Drawing Sheets

(56) References Cited

U.S. PATENT DOCUMENTS

| | | | |
|---|---|---|---|
| 2017/0279687 A1* | 9/2017 | Muntés-Mulero | H04L 41/065 |
| 2018/0367402 A1* | 12/2018 | Harneja et al. | H04L 41/12 |
| 2020/0228412 A1* | 7/2020 | Abu Asba | H04L 43/045 |
| 2020/0257731 A1* | 8/2020 | Srinivas | G06N 20/00 |
| 2020/0274763 A1* | 8/2020 | Duda | H04L 41/024 |
| 2020/0302307 A1* | 9/2020 | Bekas | G06N 5/022 |
| 2020/0326924 A1* | 10/2020 | A | G06F 8/65 |
| 2020/0412810 A1* | 12/2020 | Knight | H04L 41/145 |
| 2021/0056378 A1* | 2/2021 | Yang | G06N 20/00 |
| 2021/0232390 A1* | 7/2021 | Hwang | G06F 8/72 |

* cited by examiner

NETWORK MANAGEMENT DATA TRANSLATION, QUERYING, AND DISCREPANCY DETECTION

BACKGROUND

Networks typically include multiple elements (e.g., routers, switches, bridges, hubs, etc.) that carry and/or switch network traffic from a source to a destination. As these networks have become increasingly complex, systems and software have been implemented to monitor and manage the configuration and operation of the network elements of the networks. These management systems acquire, organize, and maintain information about components of the network. When the network needs repair, modification, expansion, or upgrading, a network administrator can refer to a network configuration management database in the system to determine an appropriate course of action. The network configuration management database may store location information and network addresses associated with the network elements, and information about the configuration and capabilities of hardware and software installed at the network elements.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Network management systems manage networks that include network elements that are often provided by many different suppliers and which use different formats and types of content for configuration management messaging that the network elements generate and send to the management systems. Also, over time, network elements may change their management messaging formatting and content. The differences in format and content of messages from different network elements can cause problems for network administrators.

In embodiments described herein, an integrated network configuration management system improves network operators' ability to manage diverse network elements that use differently formatted configuration management messaging (CMM) data. The system described herein translates CMM data from one or more formats that may be specific to particular network elements of different types, brands, or models to a CND model format. Translation of the CMM data, as described herein, enables the mapping of CMM data from multiple different formats to a common CND model format to, for example, facilitate querying of the CMM data. The CND model format may include a flexible but consistent structured data format such as, in one exemplary implementation, a graph schema. The system collects and stores the translated CMM data in a central CND model database. The CND model formatted data in the database may be subsequently retrieved or queried for use in network configuration management operations such as, for example, comparison, correlation, discrepancy detection and correction, and/or anomaly detection operations.

The exemplary graph schema described herein provides an extensible way to add node types and/or edge types, without disrupting existing data, for, for example, later added CMM formats and data elements. The CND model graph schema additionally enables a consistent way to apply queries against otherwise disparate CMM formats. "CMM data," as used herein, refers to configuration management data that may be included in a configuration management message, or other type of message, sent from a network element to a destination to report the network element's configuration, operating status, or for other purposes.

Figure 1A:
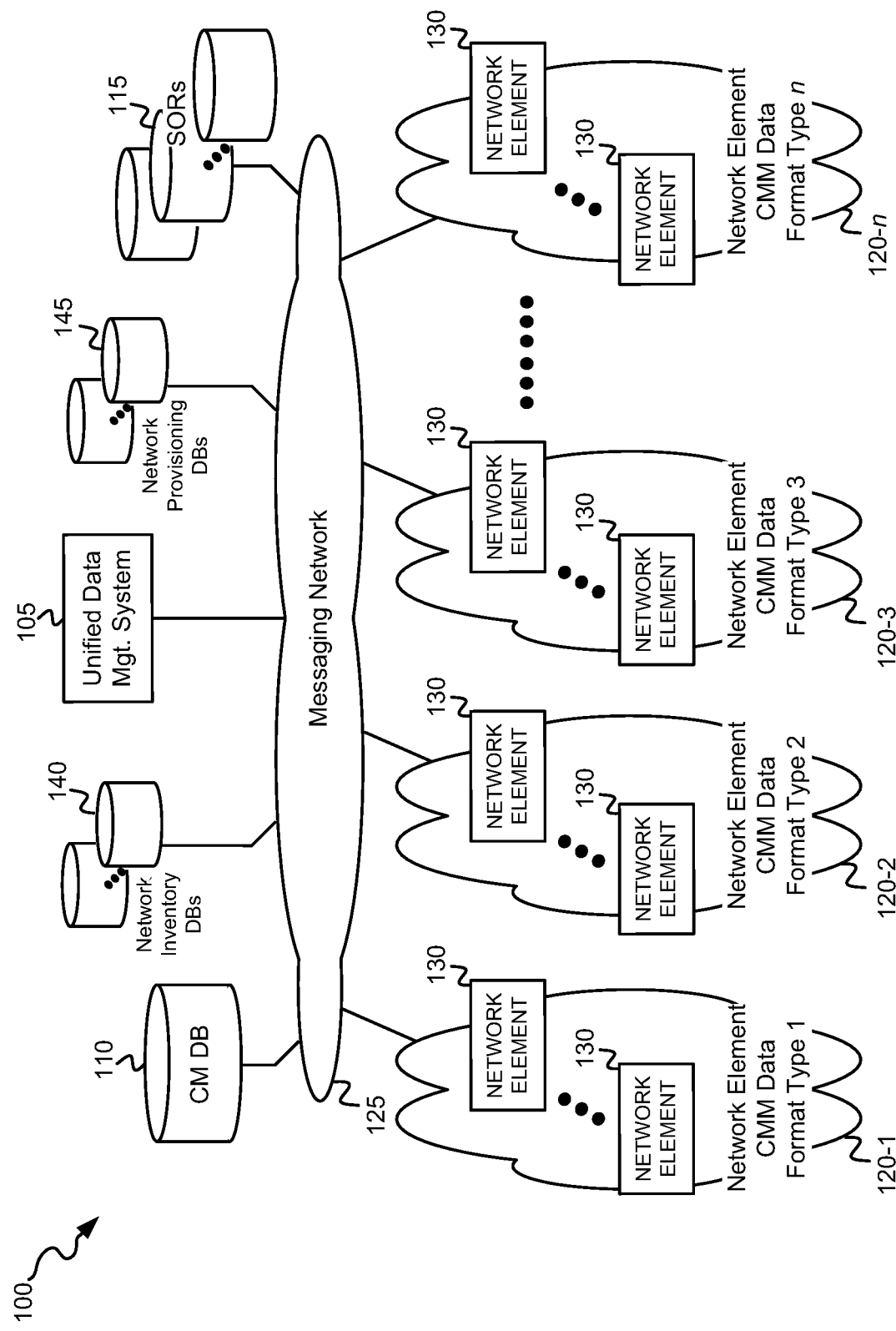
FIGS. 1A-1C are diagrams that depict an exemplary network environment in which a unified data management system translates network configuration management messages and data to a Common Network Data (CND) model format for storing, querying, anomaly detection, and discrepancy detection and correction.
Figure 1B:
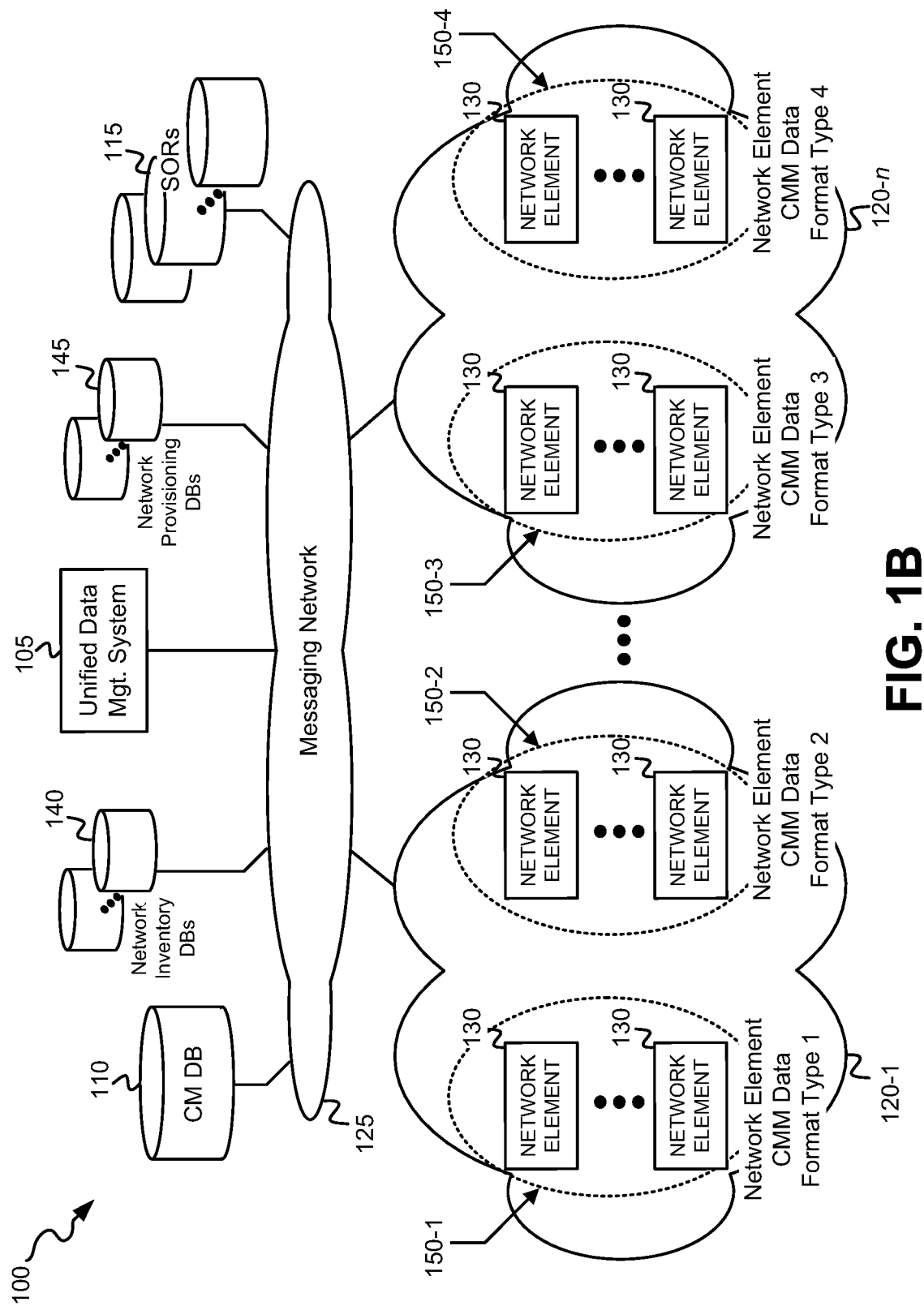
Figure 1C:
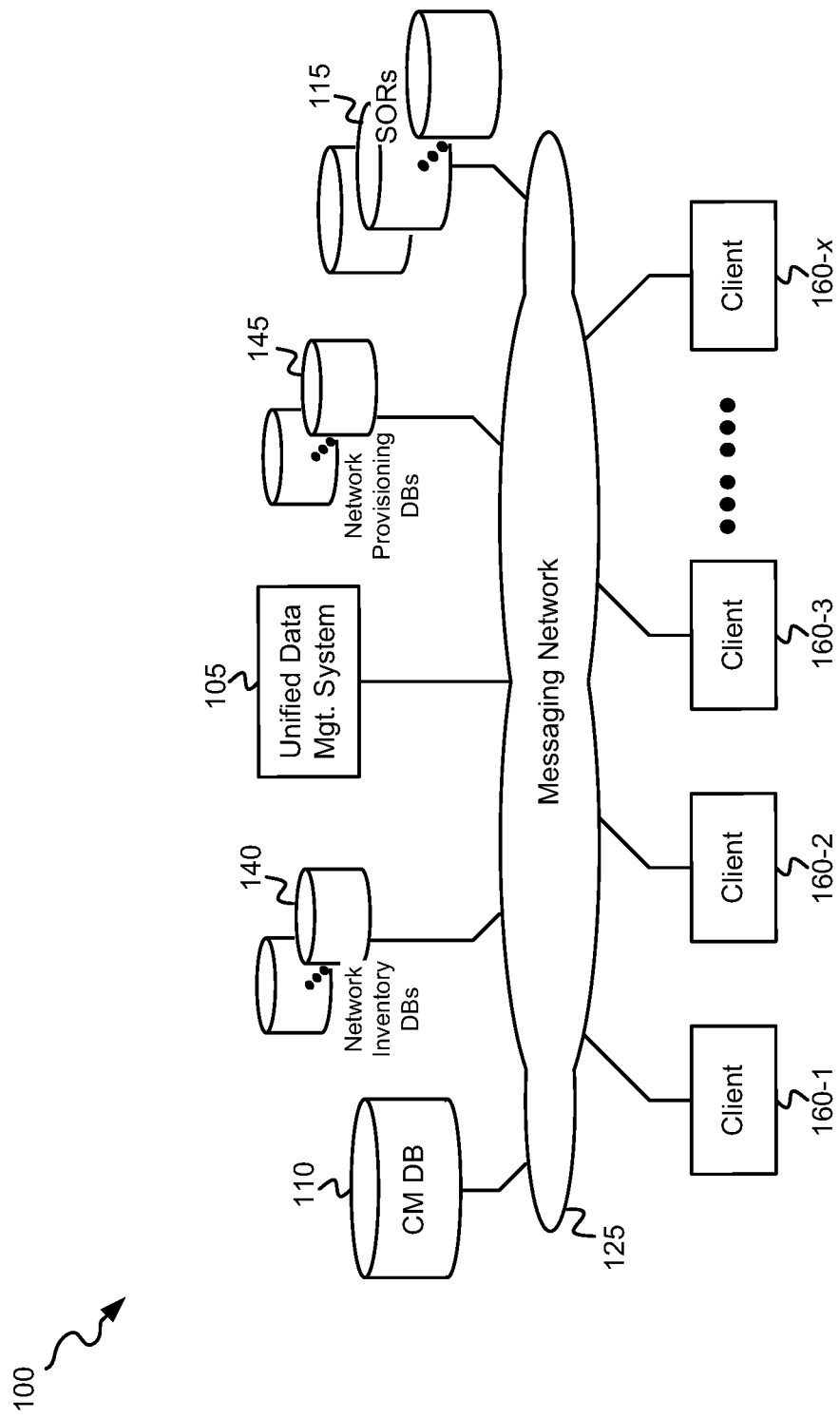

FIGS. 1A-1C are diagrams that depict an exemplary network environment 100 in which a unified data management system translates CMM data to a CND model format for storing and subsequent querying, anomaly detection, and discrepancy detection and correction. FIG. 1A depicts a view of the network environment 100 that includes different networks and their constituent network elements. The view of network environment 100 shown in FIG. 1A includes multiple networks 120-1 through 120-n, a unified data management system 105, a CND Model (CM) database (DB) 110, one or more Systems of Record (SORs) 115, a messaging network 125 (also referred to as "network 125"), one or more network inventory DBs 140, and one or more network provisioning DBs 145.

Networks 120-1 through 120-n (generically referred to herein as "network 120" or "networks 120") may each include any type of network that includes one or more network elements 130 that are involved in the delivery/transport of data between data endpoints (not shown). Each network 120 may include, for example, a wireless satellite network, a wireless public land mobile network (PLMN), a telecommunications network (e.g., a Public Switched Telephone Network (PSTN)), a wired or wireless local area network (LAN), a wired or wireless wide area network (WAN), a metropolitan area network (MAN), an intranet, the Internet, and/or a cable network (e.g., an optical cable network). Each of the network elements 130 may include, for example, a router, a bridge, a gateway, an optical switch, a data switching element, or any other type of network element associated with the delivery/transport of data across a network 120.

Unified data management system 105 includes one or more network devices that are associated with a network configuration management system (not shown). The system 105 includes functionality for translating CMM data generated by network elements 130 within networks 120-1 through 120-n. System 105 may be a component of the network configuration management system or may be a stand-alone network device(s) that communicates with the network configuration management system. Unified data management system 105 translates received CMM data from a particular network element format (e.g., specific to a particular type, brand, or model of network element) to a CND model format. The CMM data translated to the CND model format may be stored in CM DB 110 for use in future network configuration management operations, including querying, anomaly detection, discrepancy detection and correction, and discrepancy correction operations.

CM DB 110 includes one or more network devices having at least one memory device for storing a data structure. The data structure stores CND model formatted CMM data associated with the network elements 130 of networks 120. The data structure of CM DB 110 may be stored in a single network device, or may be distributed across multiple network devices. In one implementation, the data structure stored in CM DB 110 may include a graph schema, based on nodes, edges, and properties, to represent and store CMM data. An exemplary CND graph schema for CMM data is described further below with respect to FIG. 4.

SORs 115 may include network devices that each includes a memory device for storing untranslated CMM data from the network elements 130 of one or more networks 120. In one example, each SOR 115 may store untranslated CMM data associated with network elements 130 of a single particular network 120, or of a subset of networks 120 of the set of networks 120-1 through 120-n.

Messaging network 125 may connect with network elements 130 of networks 120-1 through 120-n. Messaging network 125 may connect with every network element 130 within networks 120, or only with particular network elements 130 within networks 120. Messaging network 125 may include any type of network that may receive CMM data from network elements 130 and deliver them to unified data management system 105, or to other destinations (not shown) connected to messaging network 125. Messaging network 125 may, thus, carry messages between network elements 130 and unified data management system 105, between unified data management system 105 and other destinations (not shown), between network elements 130 and SORs 115, between unified data management system 105 and CM DB 110, and between network elements 130 and other destinations (not shown). Messaging network 125 may include a network that is unaffected by a failure of components in networks 120-1 through 120-n.

Network inventory DBs 140 may include a network device(s) that further includes a memory device(s) for storing data related to an inventory of one or more networks, such as networks 120-1 through 120-n. The network inventory may include data describing the network elements, devices, and/or network components that are connected to, and/or are constituent components of, each network 120. Network provisioning DBs 145 may include a network device(s) that includes a memory device(s) for storing data related to provisioned resources within a network or networks, such as one or more of networks 120-1 through 120-n. In networks 120 using software-defined networking (SDN), the provisioning data may include, for example, data describing virtual network elements installed and configured within the network 120.

FIG. 1B depicts another view of the network environment 100 of FIG. 1A in which multiple different network elements 130, having multiple different CMM data formats, reside in a same network. The example of FIG. 1B depicts a network 120-1 having a first group 150-1 of network elements 130 and a second group 150-2 of network elements 130. The first group 150-1 of network elements 130 generates CMM data having a format type 1, and the second group 150-2 of network elements 130 generates CMM data having a format type 2, where format type 2 is different than format type 1. The view of network environment 100 of FIG. 1B further depicts a network 120-n having a first group 150-3 of network elements 130 and a second group 150-4 of network elements 130. The first group 150-3 of network elements 130 generates CMM data having a format type 3, and the second group 150-4 of network elements 130 generates CMM data having a format type 4, where format types 1, 2, 3, and 4 are different format types.

FIG. 1C illustrates another view of the network environment 100 that includes multiple client devices 140-1 through 140-x connected to messaging network 125. Client devices 140-1 through 140-x (generically referred to herein as "client 140" or "clients 140") may each include any type of electronic device having a wired or wireless communication capability. Clients 140 may each include, for example, a laptop, palmtop, desktop, or tablet computer; a cellular phone (e.g., a "smart" phone); a Voice over Internet Protocol (VoIP) phone; a smart television (TV); an audio speaker (e.g., a "smart" speaker); a video gaming device; a music player (e.g., a digital audio player); a digital camera; a device in a vehicle; a wireless telematics device; an AR/VR headset or glasses; or an Internet of Things (IoT) or Machine-to-Machine (M2M) device. A user (not shown) may carry, use, administer, and/or operate each client 140. In some circumstances, the user may be a network administrator of a network 120 (FIG. 1B). Clients 140 may send queries or requests for comparison, anomaly detection, and/or discrepancy detection, to unified data management system 105 for assisting in the management of the network elements 130 of networks 120.

The configurations of network components of network environment 100 illustrated in FIGS. 1A-1C are for illustrative purposes. Other configurations may be implemented. Therefore, network environment 100 may include additional, fewer and/or different network elements or components than those depicted in FIGS. 1A-1C.

Figure 2:
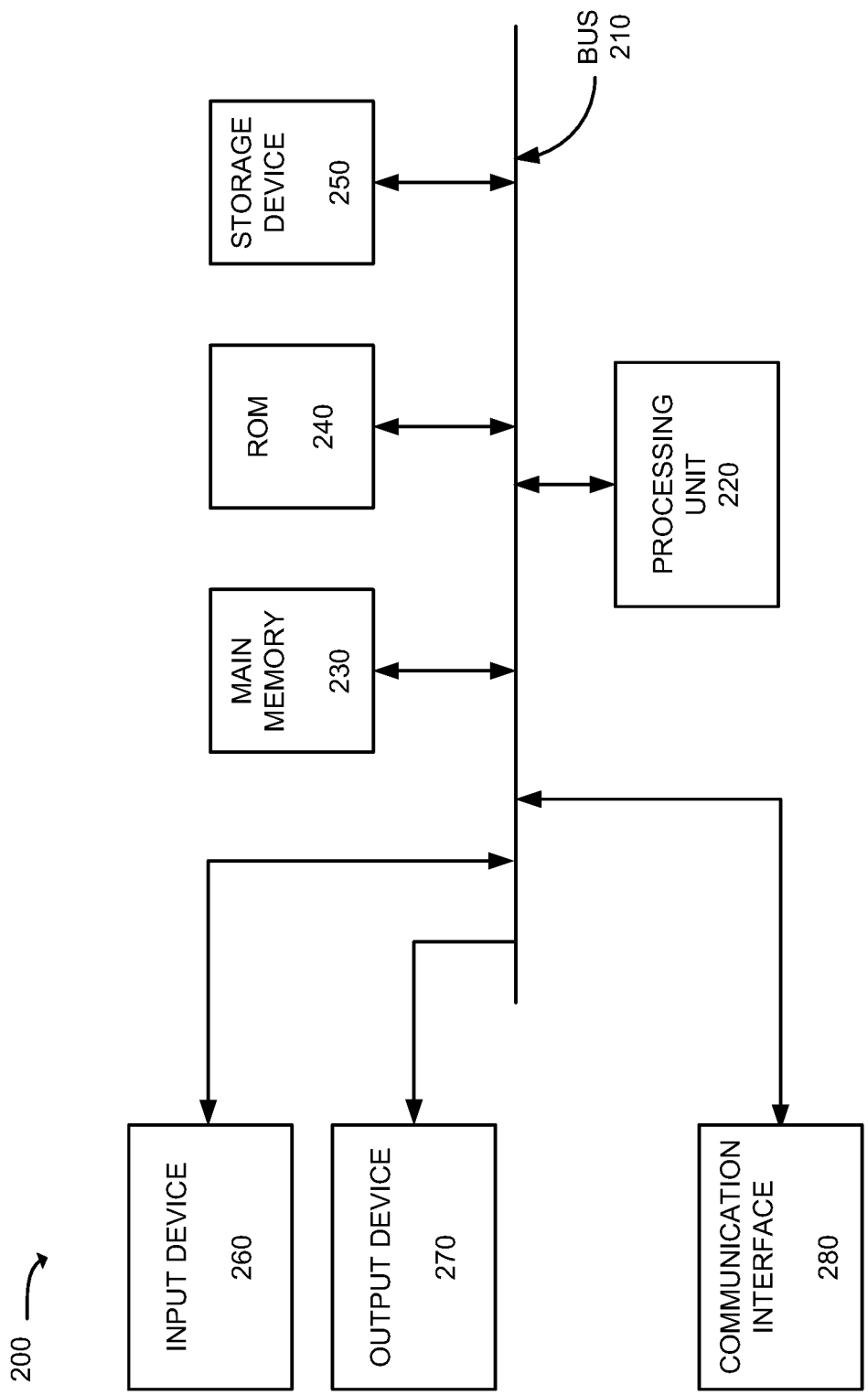
FIG. 2 is a diagram that depicts exemplary components of a device that may correspond to the unified data management system, database, Systems of Record, network elements, and/or clients of FIGS. 1A-1C.

FIG. 2 is a diagram that depicts exemplary components of a network device 200 (also referred to herein as "device 200"). Unified data management system 105, CM DB 110, SORs 115, network inventory DBs 140, network provisioning DBs 145, network elements 130, and clients 140 may include one or more of device 200, as well as additional special-purpose components that may operate together with the components of device 200. Device 200 may include a bus 210, a processing unit 220, a main memory 230, a read only memory (ROM) 240, a storage device 250, an input device(s) 260, an output device(s) 270, and a communication interface 280.

Bus 210 may include a path that permits communication among the elements of device 200. Processing unit 220 may include one or more processors or microprocessors which may interpret or execute stored instructions associated with one or more processes, or processing logic that implements the one or more processes. Processing unit 220 may include software, hardware, or a combination of software and hardware for executing the processes described herein. In one implementation, processing unit 220 may include programmable logic such as Field Programmable Gate Arrays (FPGAs) or accelerators. Main memory 230 may include a random access memory (RAM) or another type of dynamic storage device that may store information and, in some implementations, instructions for execution by processing unit 220. ROM 240 may include a ROM device or another type of static storage device (e.g., Electrically Erasable Programmable ROM (EEPROM)) that may store static information and, in some implementations, instructions for use by processing unit 220. Storage device 250 may include a magnetic and/or optical recording medium and its corresponding drive. Main memory 230, ROM 240 and storage device 250 may each be referred to herein as a "non-transitory computer-readable medium" or a "non-transitory storage medium."

Input device 260 may include one or more devices that permit a user or operator to input information to device 200. Examples of input device 260 may include a keypad or a keyboard, a display with a touch sensitive panel, voice recognition and/or biometric mechanisms, etc. Output device 270 may include one or more devices that output information to the operator or user. Examples of output device 270 may include a display, a speaker, etc. Input device 260 and output device 270 may, in some embodiments, be implemented as a graphical user interface (GUI) that displays GUI information and which receives user input via the GUI. Communication interface 280 may include at least one transceiver that enables device 200 to communicate with other devices and/or systems. For example, communication interface 280 may include a transceiver(s) that enables device 200 to communicate via messaging network 125 or via network 120.

Device 200 may perform certain operations or processes, as may be described herein. Device 200 may perform these operations in response to processing unit 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 200 illustrated in FIG. 2 is for illustrative purposes. Other configurations may be implemented. Therefore, device 200 may include additional, fewer and/or different components, arranged in a different configuration, than depicted in FIG. 2.

Figure 3:
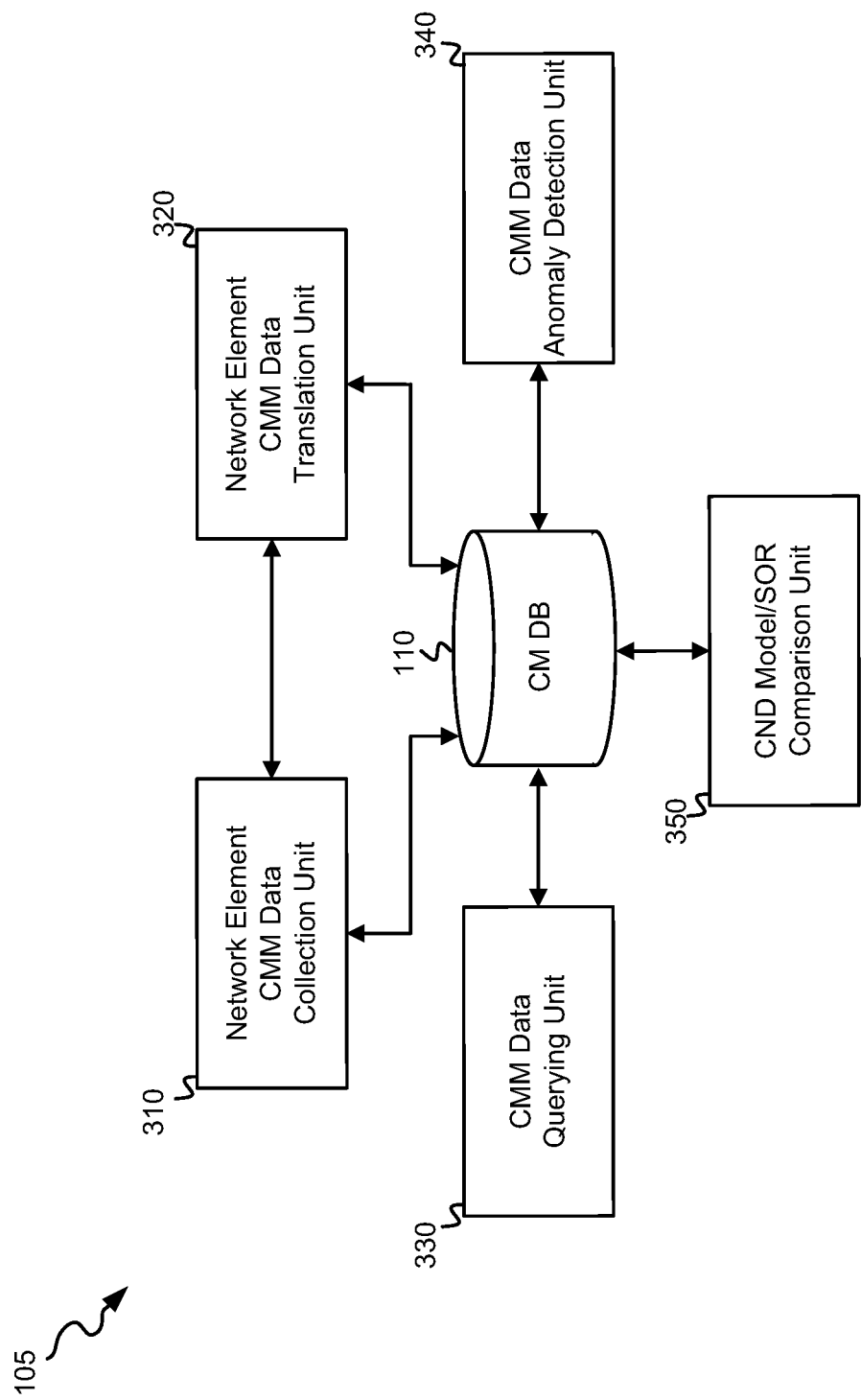
FIG. 3 is a diagram that illustrates exemplary functional components of the unified data management system of FIGS. 1A-1C.

FIG. 3 is a diagram that illustrates exemplary components of unified data management system 105. CM DB 110 is shown, in FIG. 3, as a component of unified data management system 105. In other implementations, however, CM DB 110 may not be a component of system 105, but may be a separate component/network device(s) that connects to system 105 via, for example, messaging network 125 (such as is depicted in FIGS. 1A-1C). The components of unified data management system 105 may include a network element CMM data collection unit 310, a network element CMM data translation unit 320, a CMM data querying unit 330, a CMM data anomaly detection unit 340, and a CND model/SOR comparison unit 350.

Network element CMM data collection unit 310 receives CMM data from network elements 130 and enqueues it before passing the CMM data to network element CMM data translation unit 320.

Network element CMM data translation unit 320 includes functionality for translating CMM data in n different formats ($F_1$-$F_n$) into a CND model format, such as the exemplary graph schema described with respect to FIG. 4 below. Unit 320 receives network element CMM data from data collection unit 310, and translates the CMM data to the CND model format. Upon completion of the translation, unit 320 stores the translated CMM data in CM DB 110 for future retrieval, querying, analysis, etc.

CMM data querying unit 330 receives query requests from client devices 140-1 through 140-$x$ and performs searches of CMM data stored in CM DB 110, based on the queries contained in the query requests, to obtain query-matching CMM data.

CMM data anomaly detection unit 340 performs searches of CMM data stored in CM DB 110 to identify anomalies in the CMM data. Identification of anomalies may include performing an analysis of CMM data associated with a particular network(s), a particular region of a network(s), and/or particular network elements, to identify anomalies associated with network elements 130, such as described with respect to the exemplary process of FIG. 8 below.

CND model/SOR comparison unit 350 performs comparisons of CMM data stored in one or more SORs 115 with corresponding translated CMM data cached in CM DB 110 to identify differences in content between the two. Unit 350 retrieves CMM data from a SOR 115, passes the CMM data to translation unit 320 for translation, receives the CMM data translated from the original SOR format to the CND model format, and then performs a comparison of the translated SOR CMM data with the corresponding CMM data previously received from the SOR 115, translated, and cached in CM DB 110. One exemplary implementation of a CMM data comparison process is described below with respect to FIG. 10.

The configuration of components of unified data management system 105 illustrated in FIG. 3 is for illustrative purposes. Other configurations may be implemented. Therefore, unified data management system 105 may include additional, fewer and/or different functional components than those depicted in FIG. 3.

Figure 4:
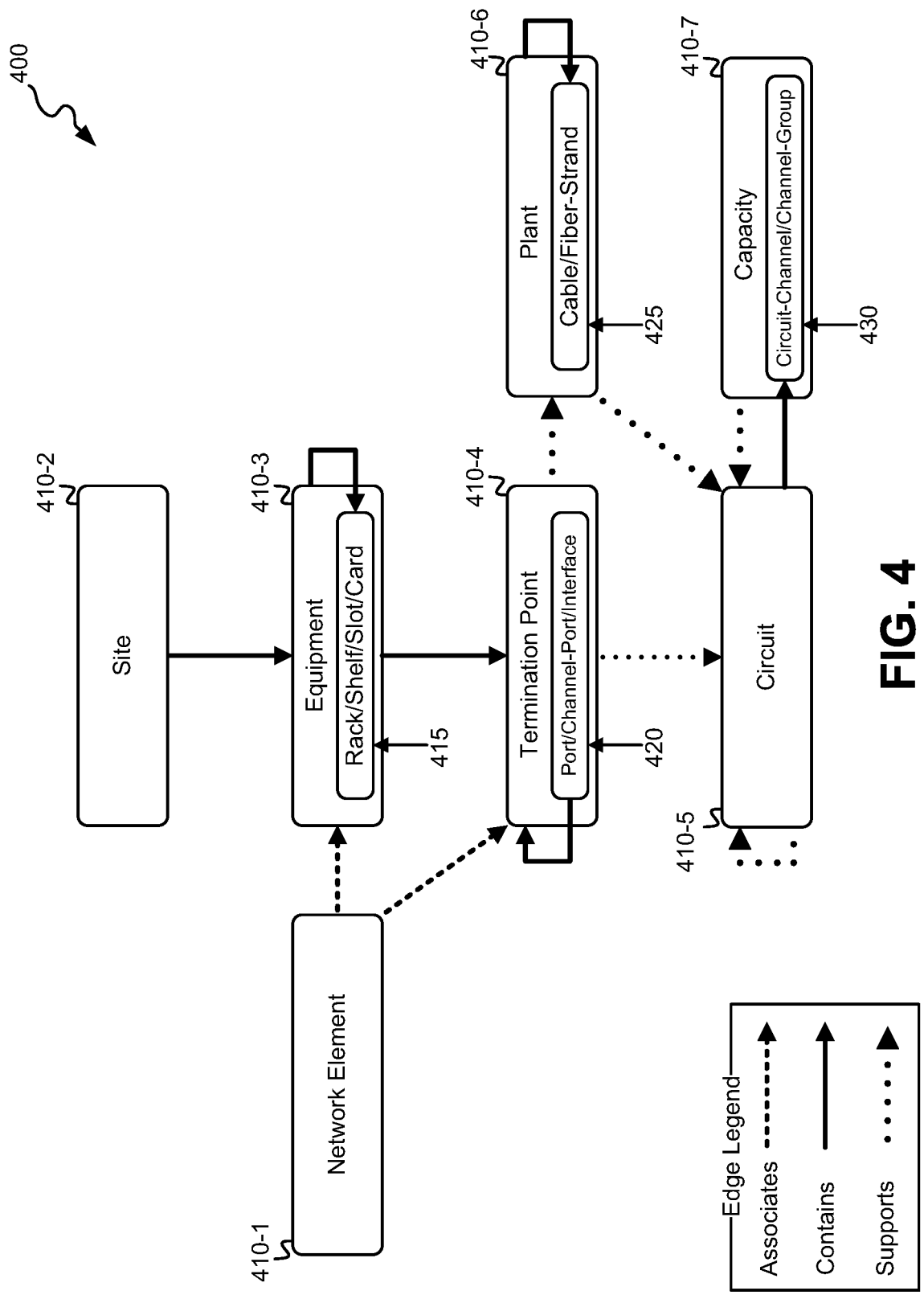
FIG. 4 illustrates an example of a data structure that may be employed for storing translated configuration management messages/data in a CND model format.

FIG. 4 illustrates an exemplary implementation of a data structure 400 that may be employed for storing translated CMM data in a CND model format. The data structure 400 shown in FIG. 4 represents CMM data in a CND model format that includes a graph composed of nodes and edges. Each node of the CND model format of the graph may store a set of data, and each edge may represent a relation between the nodes of the graph, or between items of data stored in the node. The data structure 400 shown represents a configuration of a network element 130 of networks 120 that is intended to be generally applicable to numerous different types and configurations of network elements 130.

As shown, the CND model formatted graph includes nodes 410 (e.g., nodes 410-1 through 410-7) and edges (a type of each edge is described in the "edge legend" in the bottom left-hand portion of FIG. 4). The nodes of the graph, in conjunction with the graph edges, describe the configuration of the network element 130 identified in node 410-1 and may include, for example, a network element node 410-1, a site node 410-2, an equipment node 410-3, a termination point node 410-4, a circuit node 410-5, a plant node 410-6, and a capacity node 410-7. Other nodes are possible, depending on the types of network element 130 and the configuration parameters that may be associated with such types of network element 130.

For example, a site of the network element 130 identified in node 410-1 is indicated by a site node 410-2 using, for example, a label and value pair. The site includes any entity that contains equipment in the network. Equipment associated with the network element 130 is indicated in equipment node 410-3 by, for example, one or more label and value pairs. An equipment entity is a device that terminates a connection(s) between two sites, or equipment, and transports data via the connection(s). Equipment node 410-3 may, in some implementations, identify a hierarchy of equipment devices or equipment holders associated with a particular equipment entity. For example, equipment node 410-3 may identify a rack, a shelf, a sub-shelf, a slot, a card, and/or a sub-card of a particular equipment entity. A rack includes a frame into which equipment modules may be added and further includes a configurable number of shelves. A shelf is part of a rack and includes a configurable number of slots. A sub-shelf is part of a shelf and may include a configurable number of slots. A slot is part of a shelf or sub-shelf into which a card may be added. Each slot accepts a single card. A card is a printed circuit board which may be added to a slot. A sub-card is a card fitted into a slot on another card.

A termination point(s) of the network element 130 is indicated in node 410-4 by, for example, one or more label and value pairs. Termination point node 410-4 identifies one or more ports, channel-ports, or interfaces associated with the equipment entity identified in node 410-3. A port includes a physical interface through which data is transferred in and out of the equipment entity. A channel-port includes an aggregation of multiple physical interfaces that creates a logical interface. An interface includes a software or hardware interface between the equipment entity and other network or equipment entities in a network, or between different protocol layers in the network.

A circuit(s) of the network element 130 is indicated in node 410-5 by, for example, one or more label and value pairs. A circuit may include a physical or logical circuit over which data is transported to, and from, the equipment entity identified in node 410-3. A plant of the network element 130 is indicated in node 410-6 by, for example, one or more label and value pairs. A plant includes the physical cabling and supporting infrastructure associated with the equipment entity identified in node 410-3. The plant may include, for example, a cable and/or fiber strand connected to the equipment entity identified in node 410-3. A capacity of the network element 130 is indicated in node 410-7 by, for example, one or more label and value pairs. The capacity may include, for example, a bit rate (e.g., in Megabits per second) by which a channel, or channel-group, of the circuit identified in node 410-5, transmits data.

As indicated in the "edge legend" in the bottom left of FIG. 4, the edges of the graph of data structure 400 describe an association between data of different nodes, or between data of a same node. The data associations represented by the edges of FIG. 4 include, as shown in the edge legend, "associates," "contains," and "supports." Other types of edges may, however, be used with the CND graph schema depicted in FIG. 4.

The edge between network element node 410-1 and equipment node 410-3 indicates that the network element identified in node 410-1 is associated with the equipment identified in node 410-3 and the termination point identified in node 410-4. The edge between site node 410-2 and equipment node 410-3 indicates that the site identified in node 410-2 contains the equipment identified in node 410-3. The edge between equipment node 410-3 and the rack/shelf/slot/card data 415 indicates that the equipment identified in node 410-3 contains the rack/shelf/slot/card identified in data 415.

The edge between equipment node 410-3 and termination point node 410-4 indicates that the equipment identified in node 410-3 contains the termination point identified in node 410-4. The edge between port/channel-port/interface data 420 and termination point node 410-4 indicates that the port, channel-port, or interface identified by data 420 contains the termination point identified in node 410-4. The edge between termination point node 410-4 and circuit node 410-5 indicates that the termination point identified in node 410-4 supports the circuit identified in node 410-5. The edge between termination point node 410-4 and plant node 410-6 indicates that the termination point identified in node 410-4 supports the plant identified in node 410-6.

The edge between the plant node 410-6 and cable/fiber-strand data 425 indicates that the plant identified in node 410-6 contains the cable or fiber-strand identified by data 425. The edge from plant node 410-6 to circuit node 410-5 indicates that the plant identified in node 410-6 supports the circuit identified in node 410-5. The edge from circuit node 410-5 to capacity node 410-7 indicates that the circuit identified in node 410-5 contains the circuit-channel or channel-group identified in circuit-channel/channel-group data 430 of node 410-7. The edge from capacity node 410-7 to circuit node 410-5 indicates that the capacity identified in node 410-7 supports the circuit identified in node 410-5.

The graph schema of the data structure 400 of FIG. 4, which includes multiple nodes interconnected by multiple edges for describing aspects of a network element 130 (e.g., its configuration), may be altered or modified to handle latter added formats and/or data elements. Alterations to the graph schema may include, for example, adding different node types and edge types without modifying or disrupting existing nodes, edges, or data stored within existing nodes.

The graph of the data structure 400 of FIG. 4 represents one example of the CND model format of CMM data for a network element 130. Other types of CND model formats, however, may be used. In other implementations, the graph of FIG. 4 may include a different arrangement of nodes 410 and/or different edges, or types of edges, than those shown. Other types of data structures, other than a graph schema, may be used as the CND model format.

Figure 5A:
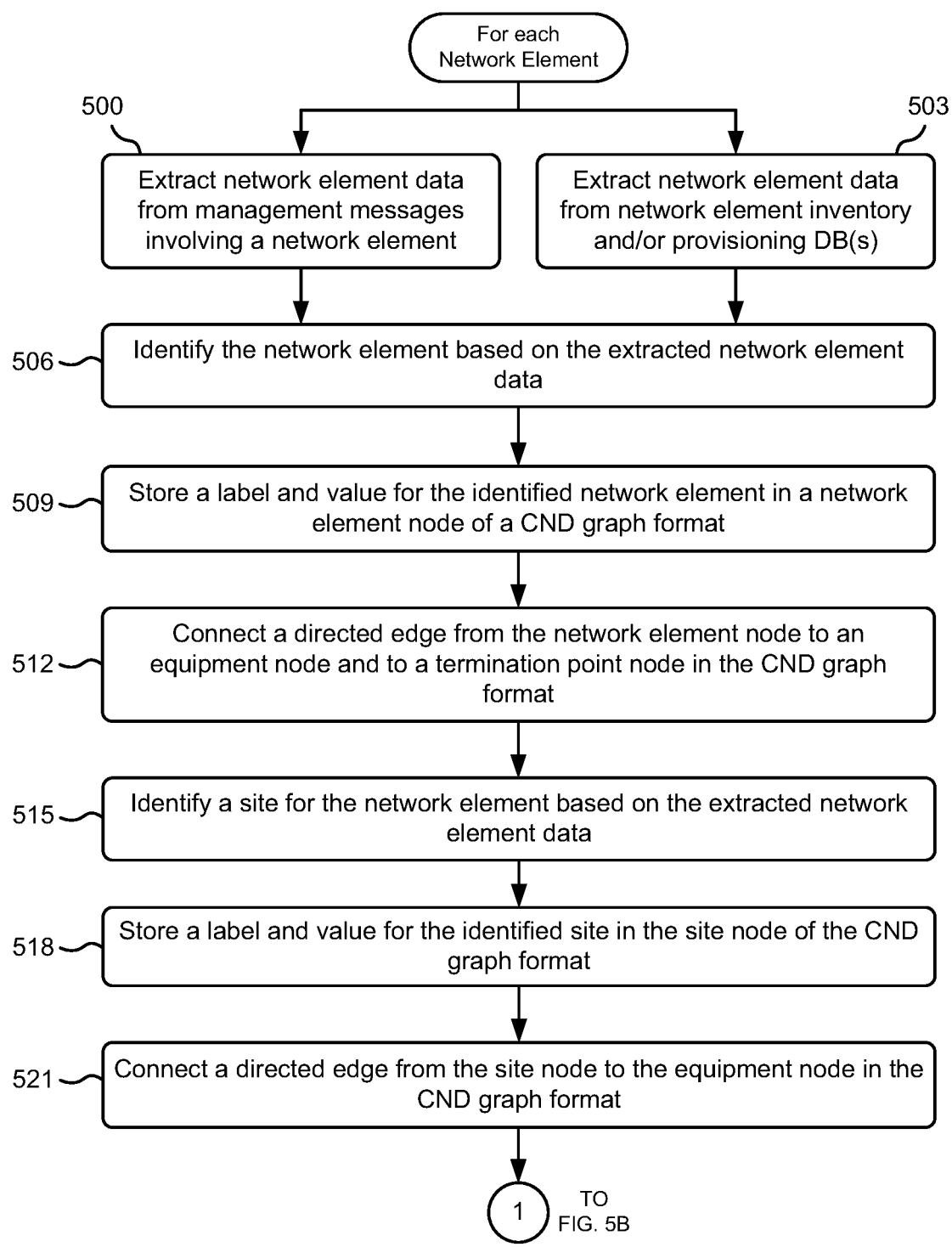
FIGS. 5A-5C are flow diagrams that illustrate an exemplary process for creating a data structure in a graph format, associated with a network element, based on management messages, network element inventory database, and/or network provisioning databases.
Figure 5B:
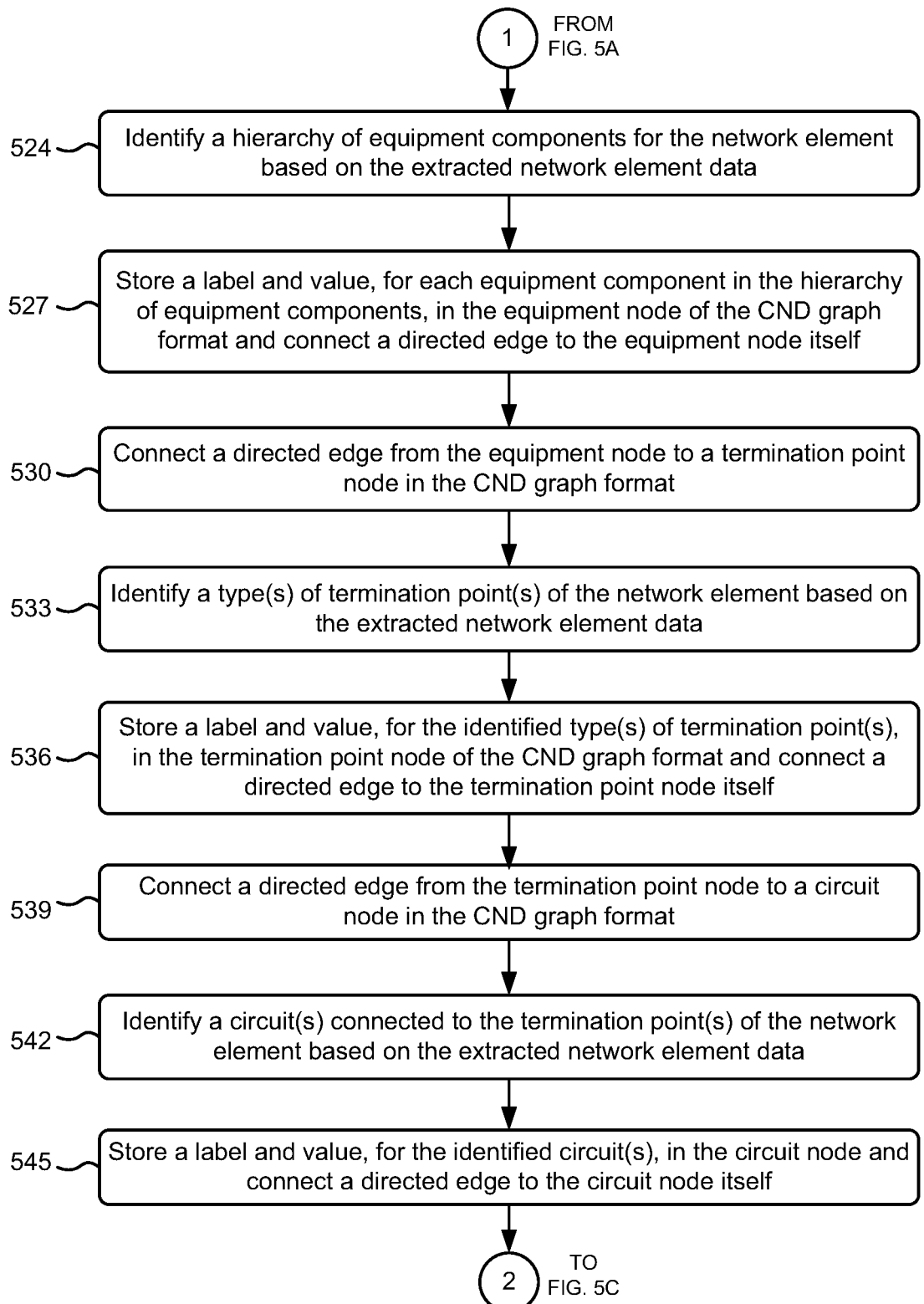
Figure 5C:
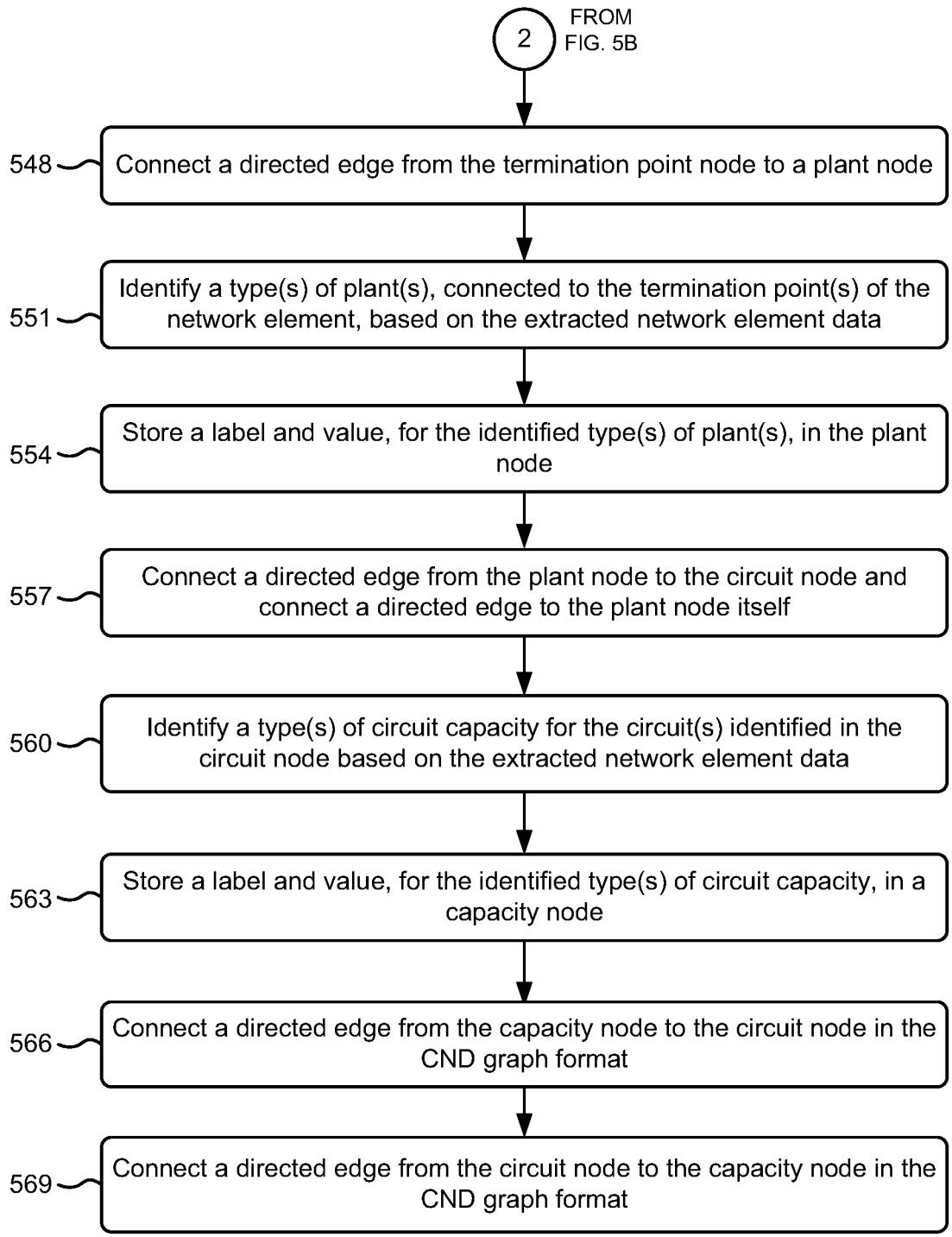

FIGS. 5A-5C are flow diagrams that illustrate an exemplary process for creating a data structure in a CND model graph schema format, associated with a network element, based on management messages, network element inventory databases and/or network provisioning databases. The exemplary process of FIGS. 5A-5C may be implemented by unified data management system 105. The description of the exemplary process of FIGS. 5A-5C below refers to the example CND data structure of FIG. 4.

The exemplary process includes unified data management system 105 extracting network element data from management messages involving a network element (block 500). Network elements 130 of networks 120-1 through 120-n of FIG. 1A or 1B may send configuration management messages (CMMs) to system 105, with each network element's CMMs possibly having a different data format than other network elements. The CMM data specifies various network configuration parameters of the network element 130 itself including, for example, the site, equipment, termination point(s), plant(s), circuit(s), and/or capacity of the network element 130. Alternatively, or additionally, unified data mgt. system 105 may retrieve CMM data, for a particular network element, that is stored in SORs 115 in an original format. Alternatively, or in conjunction with block 500, unified data management system 105 extracts network element data from a network element inventory DB(s), and/or a network provisioning DB(s) (block 503). The format of network element data stored in network inventory DBs 140, network provisioning DBs 145, and/or SORs 115 may be different than the CMM data sent from network elements 130. Further, network inventory DBs 140, network provisioning DBs 145, and SORs 115 may each store network element data in different formats such that the format of network element data stored in DBs 140 is different than network element data stored in DBs 145, which is different than network element data stored in SORs 115.

Unified data management system 105 identifies the particular network element 130 based on the extracted network element data (block 506), stores a label and value for the identified network element in a network element node of a CND graph format (block 509), and connects a directed edge from the network element node to an equipment node and to a termination point node in the CND graph format (block 512). Referring to FIG. 4, system 105 identifies, from the network element data, the network element and stores a network element label in network element node 410-1 in conjunction with a value that identifies the network element. In one implementation, the value may include a unique network element identifier associated with the network element. Further referring to FIG. 4, system 105 connects an "associates" directed edge from network element node 410-1 to equipment node 410-3 and termination point node 410-4 to indicate that equipment node 410-3 and termination point node 410-4 are associated with the network element identified in network element node 410-1.

Unified data management system 105 identifies a site for the network element based on the extracted network element data (block 515), stores a label and value for the identified site in a site node of a CND graph format (block 518), and connects a directed edge from the site node to an equipment node in the CND graph format (block 521). The extracted CMM data or network element data may identify the site of the network element, where the site includes the entity which contains the equipment of the network element. In some circumstances, the site may further include a geographic location and/or network location of the network element. Referring to the example of FIG. 4, system 105 stores a site label in node 410-2 in conjunction with a value that identifies the site of the network element/network entity. Also referring to FIG. 4, system 105 connects a "contains" directed edge from site node 410-2 to equipment node 410-3 to indicate that the network site identified in site node 410-1 contains the equipment identified in equipment node 410-3.

Unified data management system 105 identifies a hierarchy of equipment components for the network element based on the extracted network element data (block 524), stores a label and value, for each equipment component in the hierarchy of equipment components, in the equipment node of the CND graph format, and connects a directed edge to the equipment node itself (block 527). System 105 further connects a directed edge from the equipment node to a termination point node in the CND graph format (block 530). An equipment entity of the network element identified in node 410-1 may include a hierarchy of multiple equipment components, such as, for example, a rack, a sub-rack, a shelf, a sub-shelf, a slot, a card and/or a sub-card. The equipment entity may only include certain ones of the multiple equipment components of the hierarchy of equipment components. For example, a particular network element may only have rack, shelf, slot, and card equipment components. Another network element may instead have rack, sub-rack, shelf, slot, and card equipment components. Yet another network element may have rack, shelf, sub-shelf, slot, and card equipment components. Each network element may have a same combination, or a different combination, of equipment components as compared to other network elements.

Referring to the example of FIG. 4, system 105 may, based on extracted network element data, identify that the network element identified in network element node 410-1 includes the equipment components rack, shelf, slot, and card, and stores a label for each equipment component in conjunction with a value within the data 415 stored in equipment node 410-3. System 105 further connects a "contains" directed edge from equipment node 410-3 to itself (i.e., to the data 415 stored in node 410-3), and connects a "contains" directed edge from equipment node 410-3 to termination point node 410-4.

Unified data management system 105 identifies a type(s) of termination point(s) of the network element based on the extracted network element data (block 533), stores a label and value, for the identified type(s) of termination point(s), in the termination point node of the CND graph format and connects a directed edge to the termination point node itself (block 536). System 105 further connects a directed edge from the termination point node to a circuit node (block 539). Referring to FIG. 4, system 105 identifies whether the equipment identified in node 410-3 includes a port, channel-port, and/or interface, and stores a label and value, for the identified port, channel-port, and/or interface, in the data 420 of termination point node 410-4. System 105 further connects a "contains" directed edge from termination point node 410-4 to itself (i.e., from the data 420 stored in node 410-3 to node 410-4), and connects a "supports" directed edge from termination point node 410-4 to circuit node 410-5. Each equipment entity identified in node 410-3 may include one or more ports, channel-ports, or interfaces. A port includes a physical interface through which data is transferred in and out of the equipment entity. A channel-port includes an aggregation of multiple physical interfaces that creates a logical interface. An interface includes a software or hardware interface between the equipment entity and other network or equipment entities in a network, or between different protocol layers in the network.

Unified data management system 105 identifies a circuit(s) connected to the termination point(s) of the network element based on the extracted network element data (block 542), and stores a label and value, for the identified circuit(s), in the circuit node and connects a directed edge to the circuit node itself (block 545). System 105 further connects a directed edge from the termination point node to a plant node (block 548). Referring to FIG. 4, system 105 identifies the circuit(s) connects to the termination point identified in node 410-4, and stores a label and value, for the identified circuit(s) in circuit node 410-5. System 105 further connects a "supports" directed edge from circuit node 410-5 to itself (i.e., from node 410-5 back to node 410-5), and connects a "supports" directed edge from termination point node 410-4 to plant node 410-6.

Unified data management system 105 identifies a type(s) of plant(s), connected to the termination point(s) of the network element, based on the extracted network element data (block 551), stores a label and value, for the identified type(s) of plant(s), in the plant node (block 554), connects a directed edge from the plant node to the circuit node and connects a directed edge to the plant node itself (block 557). Referring to FIG. 4, system 105 identifies the physical cabling and supporting infrastructure associated with the equipment entity identified in equipment node 410-3, and stores a particular label, in conjunction with a value, for the identified plant as data 425 in plant node 410-6. The plant may include, for example, a cable and/or fiber strand connected to the equipment entity identified in node 410-3. System 105 further connects a "contains" directed edge from plant node 410-6 to itself (i.e., from node 410-6 back to data 425 in node 410-6) and connects a "supports" directed edge from plant node 410-8 to circuit node 410-5.

Unified data management system 105 identifies a type(s) of circuit capacity for the circuit(s) identified in the circuit node based on the extracted network element data (block 560), stores a label and value, for the identified type(s) of circuit capacity, in the capacity node (block 563), connects a directed edge from the capacity node to the circuit node in the CND graph format (block 566), and connects a directed edge from the circuit node to a capacity node in the CND graph format (block 569). Referring to FIG. 4, system 105 identifies the circuit capacity, such as, for example, a bit rate (e.g., in Megabits per second) by which a circuit-channel, or a channel-group, of the circuit identified in node 410-5, transmits data, and then stores a label for the circuit capacity type in conjunction with a value (e.g., the bit rate) in data 430 of capacity node 410-7. System 105 further connects a "supports" directed edge from capacity node 410-7 to circuit node 410-5 and connects a "contains" directed edge from circuit node 410-5 to data 430 of capacity node 410-7.

Figure 6:
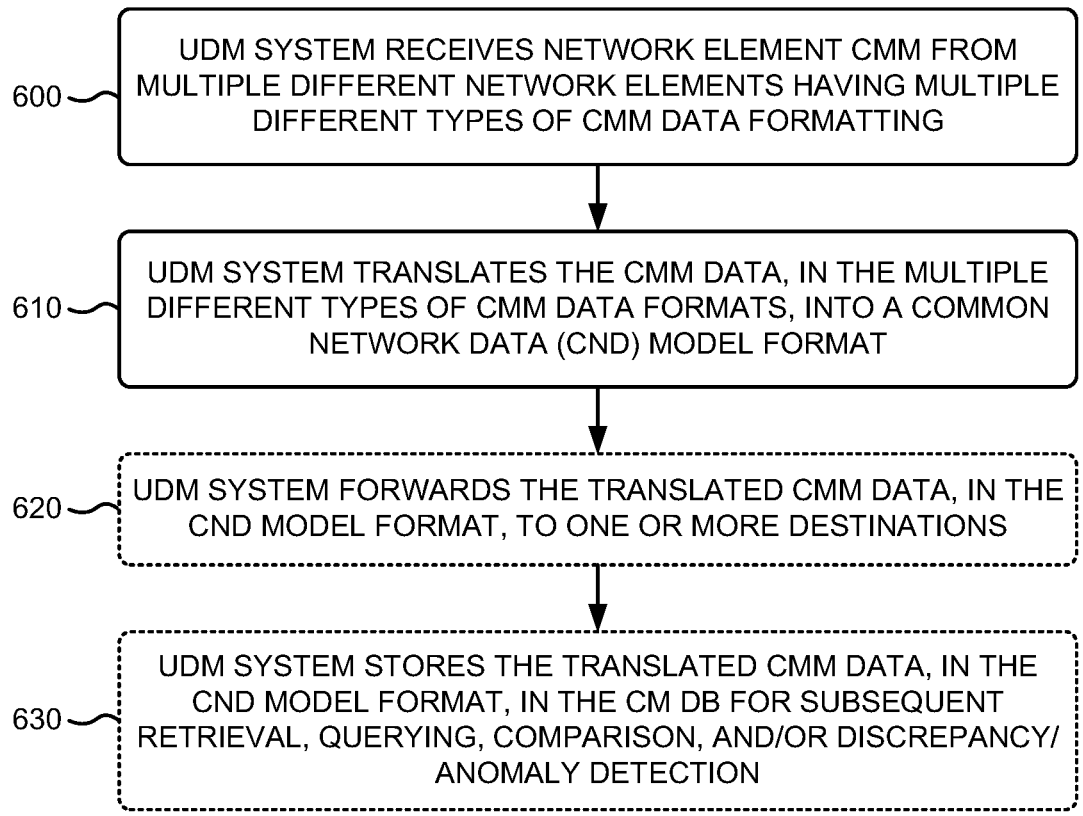
FIG. 6 is a flow diagram that illustrates an exemplary process for translating configuration management messaging data received from network elements from an initial format to a CND model format.

FIG. 6 is a flow diagram that illustrates an exemplary process for translating CMM data received from network elements 130 from an initial format to a CND model format. The exemplary process of FIG. 6 may be implemented by unified data management system 105. The description of the exemplary process of FIG. 6 below may refer to FIGS. 1A-1C.

The exemplary process includes unified data management system 105 receiving network element CMM data from multiple different network elements 130 having multiple different types of CMM data formatting (block 600). Network elements 130 of networks 120-1 through 120-n of FIG. 1A or 1B may send configuration management messages to system 105, with each network element's configuration management messages possibly having a different data format than other network elements. For example, each type, brand, and/or model of network element 130 may have its own format for generated CMM. Therefore, a network element 130 of type A may send CMM that has a data format $F_1$ to system 105, a network element 130 of type B may send CMM that has a data format $F_2$ to system 105, and a network element 130 of type C may send CMM that has a data format $F_3$ to system 105. As an additional example, a network element 130 of type A and brand $X_1$ may send CMM that has a data format $F_4$ to system 105, and a network element 130 of type A and brand $X_2$ may send CMM that has a data format of $F_5$ to system 105. Regardless of the format of the configuration management messages from each network element 130, the CMM data specifies various network configuration parameters associated with the network element 130 including, for example, the site location, equipment, termination points, plants, circuits, and/or capacity of the network element 130.

Unified data management system 105 translates CMM data, in the multiple different types of CMM data formats, into a CND model format (block 610). System 105 includes hardware or software functionality for translating each different messaging data format Fx into the CND model format. In one implementation, the CND model format includes a graph schema/format that represents and stores the network configuration management data of each translated CMM. For example, system 105 may translate the network configuration management data of a message from an initial format into a CND model graph format such as that shown in the example of FIG. 4.

In one embodiment in which unified data management system 105 serves as a message translating intermediary, system 105 forwards the translated CMM data, in the CND model format, to one or more destinations (block 620). In this embodiment, the intended destinations for receipt of the CMM data may require the CMM data to be formatted in the CND model format instead of the original format sent from the originating network element(s) 130. For example, a network configuration management system (not shown in FIGS. 1A-1C) may expect to receive the messages from the network elements 130 in the CND model format, and system 105 acts as an intermediary for translating and forwarding the CMM in the CND model format to the network configuration management system.

In addition to, or instead of, performing block 520, unified data management system 105 stores the translated CMM data of block 510, in the CND model format, in CM DB 110 for subsequent retrieval, querying, comparison, and/or discrepancy/anomaly detection (block 630). As described above, CM DB 110 may include a data structure for storing CMM data that has been translated into the CND model format (e.g., a graph schema/format such as described with respect to FIG. 4).

Figure 7:
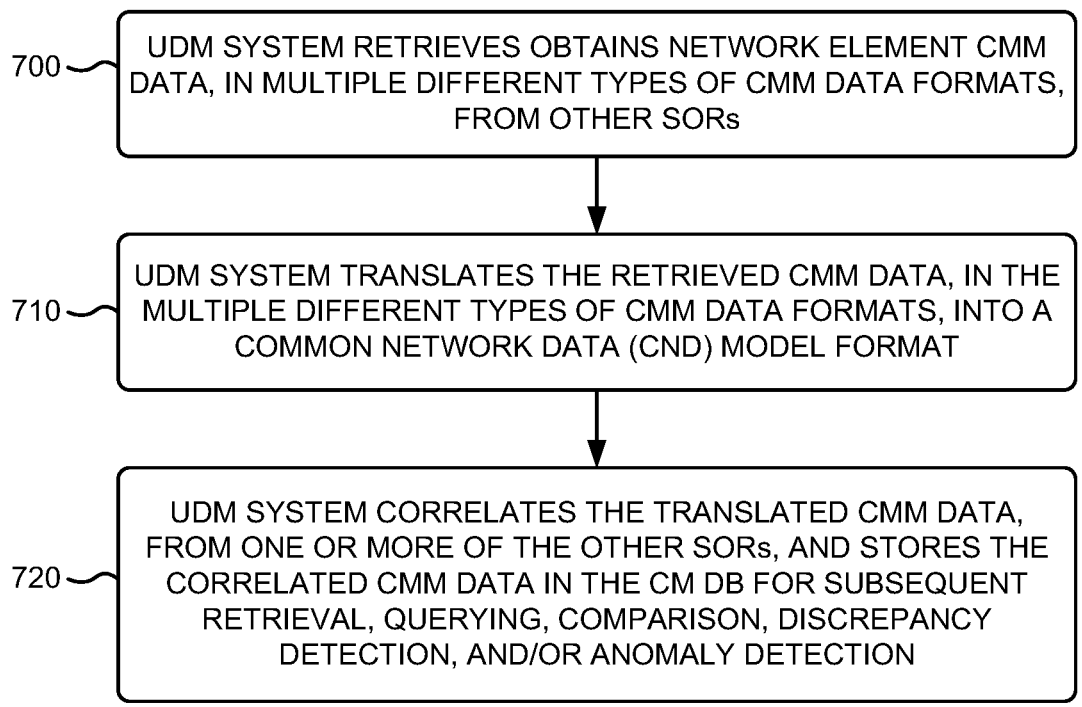
FIG. 7 is a flow diagram that illustrates an exemplary process for translating configuration management messaging data obtained from Systems of Record from an initial format to a CND model format and for correlating the messaging data from the Systems of Record.

FIG. 7 is a flow diagram that illustrates an exemplary process for translating CMM data obtained from SORs 115 from an initial format to a CND model format and for correlating the CMM data from the SORs 115. The exemplary process of FIG. 7 may be implemented by unified data management system 105. The description of the exemplary process of FIG. 7 below may refer to FIGS. 1A-1C.

The exemplary process includes unified data management system 105 obtaining stored network element CMM data, in different types of CMM data formats, from other SORs 115 (block 700). In some circumstances, unified data management system 105 may "pull" the data from one or more SORs 115 by sending a retrieval request(s) to each target SOR 115, and receiving the requested CMM data from each target SOR 115. In other circumstances, one or more SORs 115 may "push" CMM data to system 105 for translation.

Unified data management system 105 translates the retrieved CMM data, in the multiple different types of message/data formats, into a CND model format (block 710). System 105 translates each different messaging data format F, of the obtained SOR 115 CMM data, into the CND model format. As described above, the CND model format may include a graph schema that represents and stores the network configuration management data of the translated messages. For example, system 105 may translate the CMM data from the initial format into a CND model graph format similar to that shown in FIG. 4.

Unified data mgt. system 105 correlates the translated CMM data, from one or more of the other SORs 115, and stores the correlated CMM data in the CM DB 110 for subsequent retrieval, querying, comparison, discrepancy detection, and/or anomaly detection (block 720). System 105 may determine relationships and connections among CMM data stored in the multiple SORs 115 for certain purposes. For example, when there is a failure in a network, system 105 may correlate the CMM data from one or more SORs 115 storing that CMM data to identify causes of the failure or to identify one or more events at different network elements associated with the failure. As a further example, a network administrator may wish to provision a new customer connection between two endpoints and needs to determine which network elements are in the path between the two endpoints and what resources these network elements have available. In this example, system 105 may correlate the CMM data stored in one or more SORs 115 to determine which network elements need to be involved in the provisioning. For example, system 105 may employ the process of FIG. 11 below to correlate network element data to trace network elements and their interconnections with other network elements to identify a network element in a particular path between two endpoints. As yet another example, a network administrator may need to identify network elements 130 that are operating above a certain threshold capacity. A query of CM DB 110 enables a determination of those network elements 130 that are operating above threshold capacities, and a determination of network areas where additional network elements need to be deployed.

Figure 8:
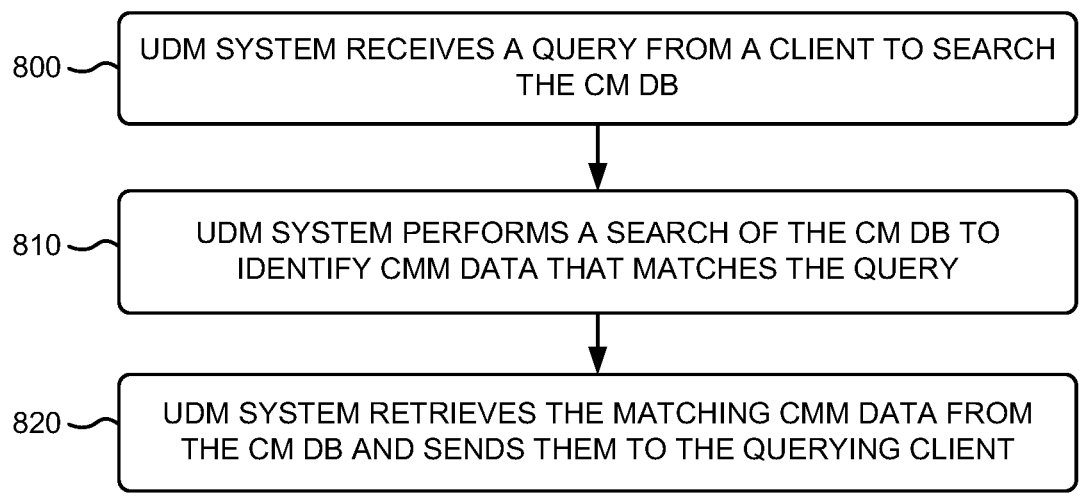
FIG. 8 is a flow diagram that illustrates an exemplary process for querying configuration management messages/data, stored in a CND model format in the CND model database of FIG. 1A, to search and retrieve particular configuration management messages/data.

FIG. 8 is a flow diagram that illustrates an exemplary process for querying CMM data, stored in a CND model format in CM DB 110, to search and retrieve particular CMM data. The exemplary process of FIG. 8 may be implemented by unified data management system 105. The description of the exemplary process of FIG. 8 below may refer to FIGS. 1A-1C.

The exemplary process includes unified data management system 105 receiving a query from a client 140 to search the CM DB 110 (block 800). Referring to FIG. 1C, a client 140 may send a query request, via messaging network 125, to unified data management system 105. The query request may include, for example, an indication of particular network elements, particular networks, or events (e.g., an alarm) in a network. The query request may include other types of queries relating to network elements 130 and/or networks 120-1 through 120-n. In one example, the query from a client 140 may request topology data related to a network 120, a region of a network 120, or a group of network elements 130.

Unified data management system 105 performs a search of the CM DB 110 to identify CMM data that match the query (block 810). System 105 may use existing data searching techniques to search CM DB 110 based on the received query. For example, system 105 may perform a simple data matching search that attempts to locate CMM data stored in CM DB 110 having data items that exactly match data of the search query.

Unified data management system 105 retrieves the matching CMM data from the CM DB 110 and sends them to the querying client 140 (block 820). System 105 retrieves, from CM DB 110, the located CMM data that were matched to the received query in block 810. System 105 then forwards the matching CMM data to the requesting client 140.

Figure 9:
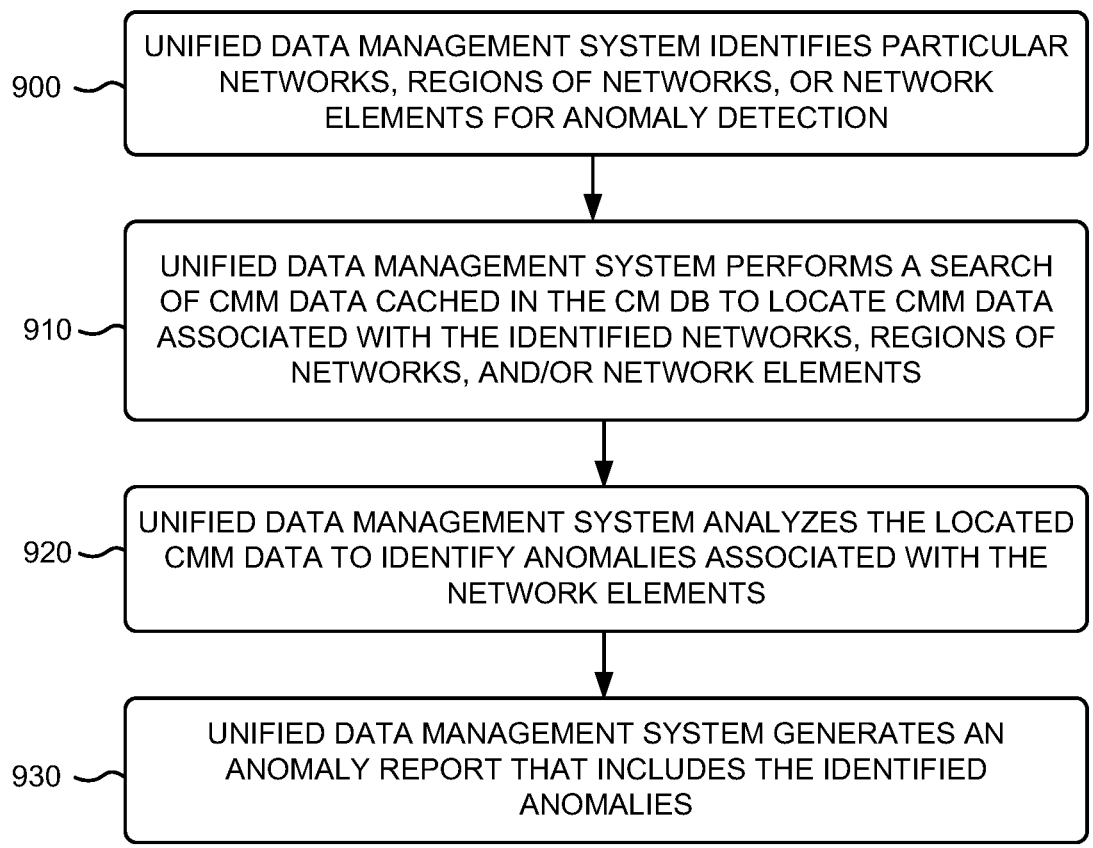
FIG. 9 is a flow diagram that illustrates an exemplary process for detecting anomalies associated with network elements using configuration management messaging/data stored in the CND model database of FIG. 1A.

FIG. 9 is a flow diagram that illustrates an exemplary process for detecting anomalies associated with network elements 130 using CMM data stored in CM DB 110. The exemplary process of FIG. 9 may be implemented by unified data management system 105. The description of the exemplary process of FIG. 9 below may refer to FIGS. 1A-1C.

The exemplary process includes unified data management system 105 identifying particular networks 120, particular regions of networks 120, and/or particular network elements 130 for anomaly detection (block 900). A network administrator may, for example, identify a network 120, a region of the network 120, a group of network elements 130, or a particular network element 130 for anomaly detection. Unified data management system 105 performs a search of CMM data cached in the CM DB 110 to locate CMM data associated with the identified networks 120, regions of networks 120, and/or network element(s) 130 (block 910). System 105 matches the identified network(s) 120, region of network(s) 120, and/or network element(s) with particular CMM data stored in CM DB 110. System 105 may, for example, locate CMM data that originated within, or from, the identified networks 120, region or networks 120, or network element(s) 130.

Unified data management system 105 analyzes the located CMM data to identify anomalies associated with the network elements 130 (block 920). In one implementation, system 105 may apply a set of engineering rules to network element data associated with a particular network(s), a region of a network, or a network element(s) to identify aspects of the CMM data associated with the network element(s) that are "anomalous" and do not conform to the engineering rules. For example, a set of engineering rules may specify a required configuration for a particular type of network element, and an analysis of the CMM data for a network element 130 of the particular type may identify that the network element 130 does not conform to the engineering rules. In one specific example, the engineering rules may require that a particular network element, or a particular type of network element, has a certain type of card located in a particular slot and/or shelf of the network element's equipment, and an analysis of the network element's CMM data may identify that no card is located in the particular slot, or a wrong type of card is located in the particular slot. As described further below with respect to block 930, a notification may then be generated that notifies, for example, a network administrator of a network 120 in which the network element 130 resides of the identified anomaly associated with the network element(s) 130.

Unified data management system 105 generates an anomaly report that includes the identified anomalies (block 930). System 105 generates an indication or description of the analysis performed in block 920, and an identification and corresponding indication or description of each anomaly identified in block 920. System 105 may, for example, send the generated anomaly report to a network administrator associated with the particular network(s) 120.

Figure 10:
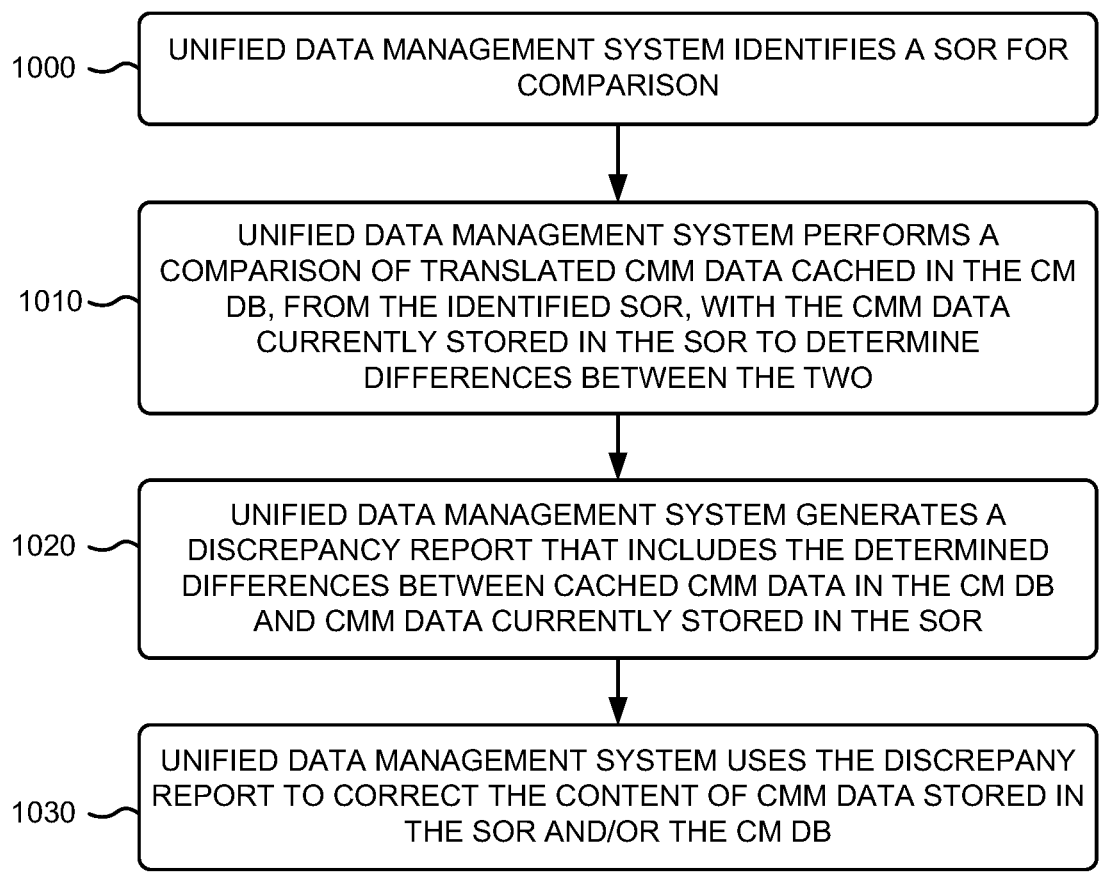
FIG. 10 is a flow diagram that illustrates an exemplary process for detecting and correcting discrepancies between one or more Systems of Record and corresponding configuration management messaging/data stored in the CND model database of FIG. 1A.

FIG. 10 is a flow diagram that illustrates an exemplary process for detecting and correcting discrepancies between one or more SORs 115 and corresponding CMM data stored in CM DB 110. The exemplary process of FIG. 10 may be implemented by unified data management system 105. The description of the exemplary process of FIG. 10 below may refer to FIGS. 1A-1C.

The exemplary process includes unified data management system 105 identifying a SOR 115 for comparison (block 1000). In some circumstances, system 105 may periodically select one of SORs 115 for discrepancy analysis and detection and perform the process of FIG. 10. In other circumstances, system 105 may initiate the process of FIG. 10 based on instructions received from a system administrator of a particular network 120 that has CMM data stored in a given SOR 115.

Unified data management system 105 performs a comparison of translated CMM data cached in the CM DB 110, originating from the identified SOR 115, with the CMM data currently stored in the SOR 115 to determine differences between the two (block 1010). During the process of FIG. 7 above, system 105 retrieves CMM data from SORs 115, translates the retrieved CMM data, and caches the translated CMM data in CM DB 110. System 105 may, in the process of FIG. 10, subsequently (e.g., periodically) perform a comparison of the cached, translated CMM data with the original messages/data still stored in the SOR 115 to identify discrepancies.

Unified data management system 105 generates a discrepancy report that includes the determined differences between cached CMM data in the CM DB 110 and CMM data currently stored in the SOR 115 (block 1020). System 105 generates an indication or description of the particular CMM data in CM DB 110 that are determined to have differences with the original CMM data stored in the SOR 115. System 105 may additionally include in the discrepancy report an indication or a description of the differences between the CMM data stored in CM DB 110 and the original CMM data stored in SOR 115. System 105 may, for example, send the generated anomaly report to an administrator, or other entity, associated with the SOR(s) 115 identified in block 1000.

Unified data management system 105 uses the discrepancy report to correct the content of CMM data stored in the SOR 115 and/or the CM DB 110 (block 1030). In some implementations, system 105 may optionally perform block 1030 to correct the content of the CMM data in CM DB 110 or the SOR 115. In one implementation, any differences between the compared CMM data of the SOR 115 and the CM DB 110 may be assumed to be a data error in the CM DB 110 and the messages/data at issue in CM DB 110 may be corrected based on the corresponding CMM data in the SOR 115. In another implementation, any differences between the compared CMM data of the SOR 115 and the CM DB 110 may be assumed to be a data error in the SOR 115 and the CMM data at issue in SOR 115 may be corrected based on the corresponding CMM data in CM DB 110.

Figure 11:
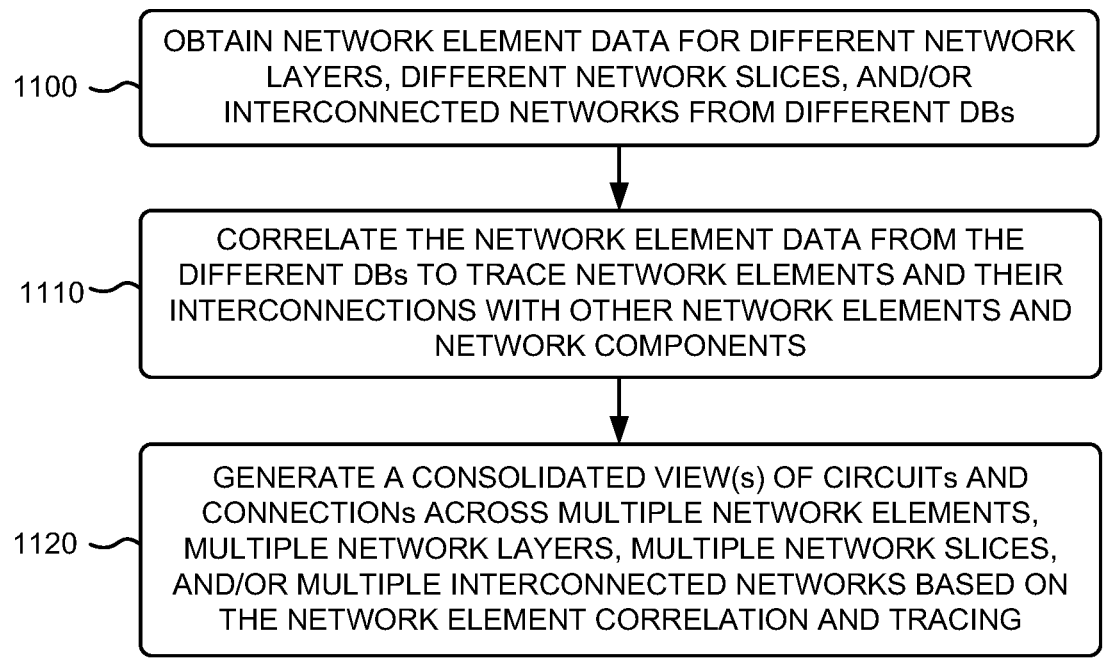
FIG. 11 is a flow diagram that illustrates an exemplary process for generating a consolidated view of circuits and connections across network elements within interconnected networks.

FIG. 11 is a flow diagram that illustrates an exemplary process for generating a consolidated view of circuits and connections across network elements within interconnected networks. The exemplary process of FIG. 11 may be implemented by unified data management system 105. The description of the process of FIG. 11 below may refer to FIGS. 1A-1C and to the example network of FIG. 12 and the example user interface of FIG. 13.

Figure 12:
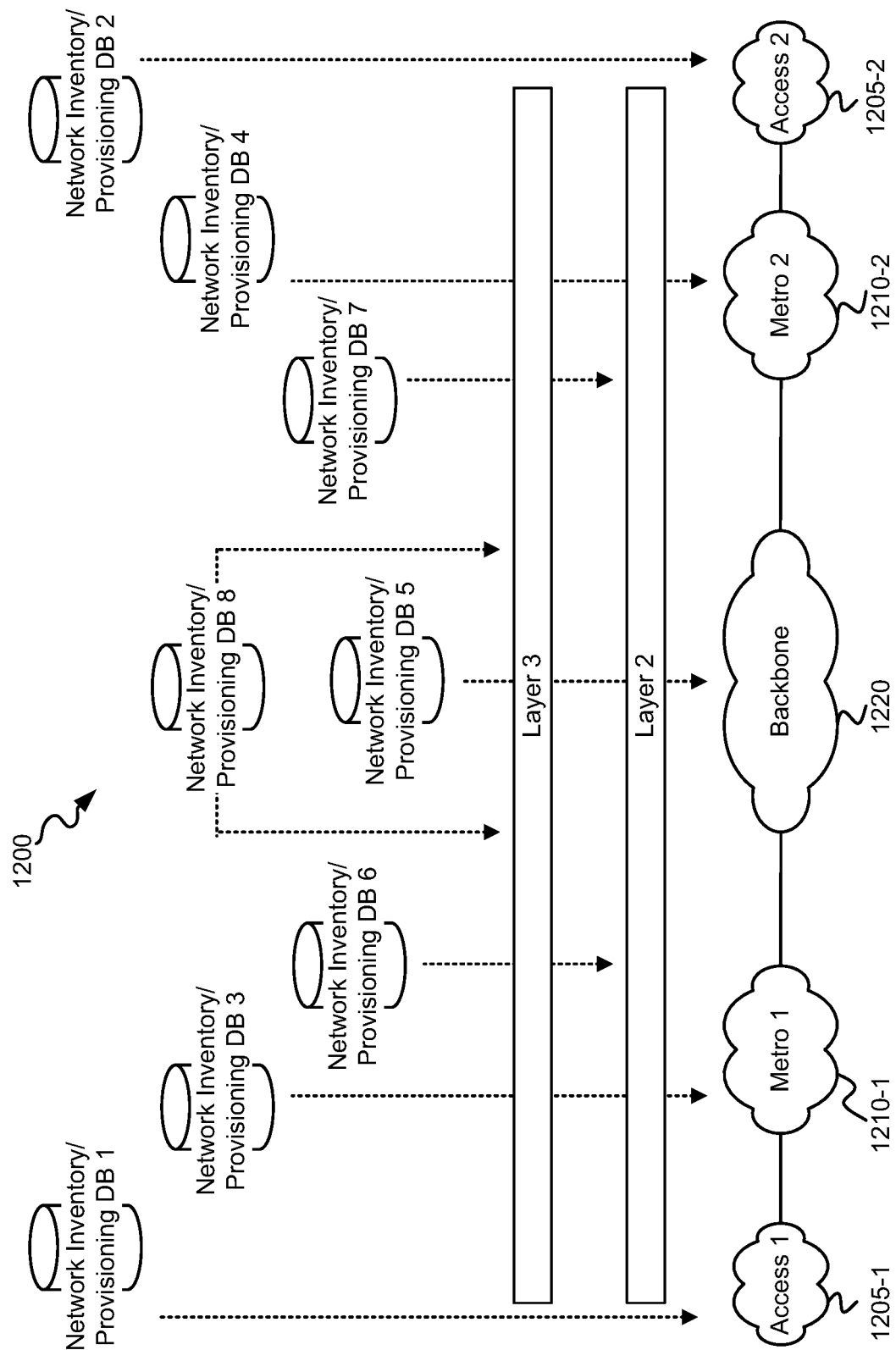
FIG. 12 shows an example of a network environment in which multiple networks interconnect to permit end-to-end data transport across the networks.

The exemplary process includes unified data management system 105 obtaining network element data, for different network layers, different network slices, and/or different interconnected networks, from different DBs (block 1100). System 105 may access network inventory DBs 140, network provisioning DBs 145, CM DB 110, and/or SORs 115 to retrieve data for network elements associated with different network layers, different network slices, and/or different networks. FIG. 12 shows an example of a network environment 1200 in which multiple networks interconnect to permit end-to-end data transport across the networks. In the example shown, an access network 1205-1 connects to a first metro network 1210-1. Metro network 1210-1 further connects to the network backbone 1220. Furthermore, in the example shown, backbone 1220 connects with a second metro network 1210-2, which connects with a second access network 1205-2. Each of networks 1205-1, 1205-2, 1210-1, 1210-2 and 1220 may in some cases comprise different networking technologies. A first user equipment device (UE) (not shown) may engage in data transport with a second UE (not shown), or with another network device (e.g., a server), across the multiple interconnected networks shown in FIG. 12.

Each network/layer/connection may be associated with an inventory/provisioning database. As shown in FIG. 12, a network inventory/provisioning DB 1 may store network inventory data, and/or data related to provisioned resources, for first access network 1205-1. A network inventory/provisioning DB 2 may store network inventory data, and/or data related to provisioned resources, for second access network 1205-2. Network inventory provisioning DB 3 may store network inventory data, and/or data related to provisioned resources, for metro network 1210-1 and network inventory provisioning DB 4 may store network inventory data, and/or data related to provisioned resources, for metro network 1210-2. Network inventory/provisioning DB 5 may store network inventory data, and/or data related to provisioned resources, for backbone 1220.

In some implementations, separate databases may be provided for higher layer/virtual networking constructs. As shown in FIG. 12, network inventory/provisioning DBs 6-7 may store network inventory data, and/or data related to provisioned resources, for logical layer 2 information across the various networks. Likewise, network inventory/provisioning DBs 8 may store network inventory data, and/or data related to provisioned resources, for logical layer 3 information across the various networks.

The network inventory/provisioning DBs 1-8 shown in FIG. 12 may correspond to network inventory DBs 140 and/or network provisioning DBs 145 of FIGS. 1A-1C. In some cases, networks may share a database (for example, where the network/layer/connection uses a similar underlying technology or geography). For example, metro network 1 and metro network 2 may use the same underlying technology, and may be associated with the same database, in which case DB3 and DB4 may be the same database. In the example of FIG. 12, unified data management system 105 obtains the network element data, for the different network layers, different network slices, and/or different interconnected networks from network inventory/provisioning DBs 1-8.

Unified data management system 105 correlates the network element data from the different DBs to trace network elements and their interconnections with other network elements and network components (block 1110). System 105 may analyze and compare the retrieved network element data, such as, for example, physical (e.g., network to network interface (NNI) ports) and logical layer/virtual (e.g., virtual local area network (VLAN) IDs) connections between network elements, to trace the interconnections between and among multiple different network elements. Numerous different network elements may have various interconnections among one another, including termination points, physical and virtual circuits, and plants. System 105, through analysis and comparison of the termination points, physical and virtual circuits, and plants associated with each of the different network elements, may trace the various interconnections between the different network elements. For example, NNI ports at a first network element may be traced to corresponding NNI ports at second and third network elements via interconnecting cables or fibers. Referring to the example of FIG. 12, unified data management system 105 may correlate the network element data from network inventory/provisioning DBs 1-8 to trace network elements and their interconnections with other network elements and network components across access network 1205-1, metro network 1210-1, backbone network 1220, metro network 1210-2, and access network 1205-2.

Unified data management system 105 generates a consolidated view(s) of circuits and connections across multiple network elements, multiple network layers, multiple network slices, and/or multiple interconnected networks based on the network element correlation and tracing (block 1120). System 105, as it performs the network element data analysis and comparison of block 1110 to trace the interconnections between the different network elements across the network layers, network slices, and/or different networks, stores tracing data that may be shown in a visual format, such as via a graphical user interface (GUI) of a client device 160. The visual format of the GUI presents a consolidated view of multiple network elements, and their interconnections, within and across different network layers, within network slices, and within and across different interconnected networks. System 105 may, thus, "stitch" together network element data from different data sources (e.g., from CM DB 110, SORs 115, network inventory DBs 140, and/or network provisioning DBs 145) to generate the consolidated view of circuits and connections across multiple network layers, multiple network slices, and/or multiple interconnected networks.

Figure 13:
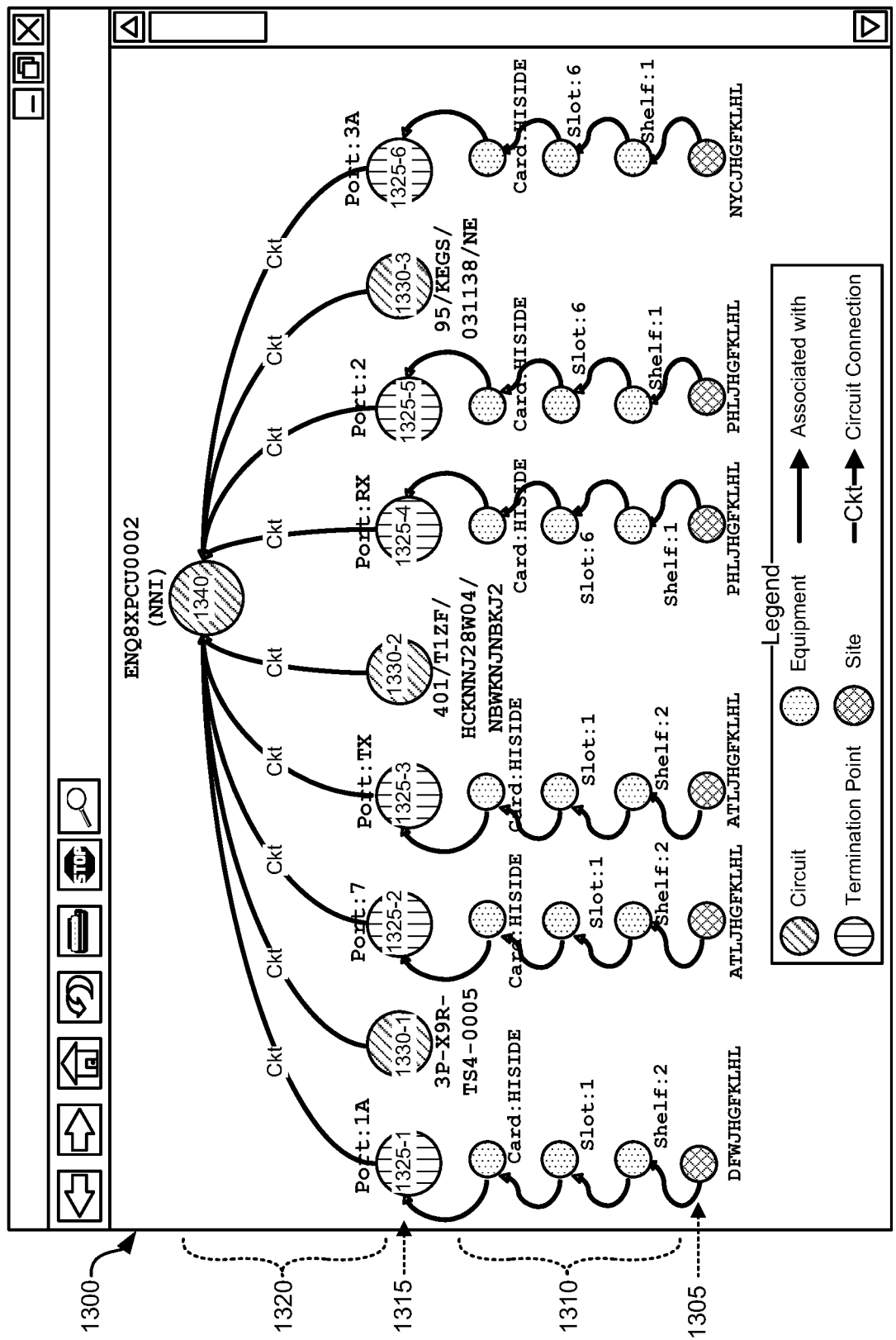
FIG. 13 depicts an example of a user interface that displays a consolidated view of circuits and connections across the interconnected networks of the example of FIG. 12.

FIG. 13 depicts an example of a user interface 1300 that can display the consolidated view of circuits and connections across, for example, the interconnected networks (or a portion of the interconnected networks) of the example of FIG. 12. The view displayed by user interface 1300 may show network element sites 1305, and the equipment elements 1310 residing at each site 1305, stitched together across the interconnected networks shown in the example of FIG. 12. The view displayed by user interface 1300 may further show termination points 1315, and the circuits 1320 that connect between a network-to-network interface (NNI) device 1340 and the termination points 1315. Each of the network element sites 1305 may be assigned its own site identifier (ID) for uniquely identifying the site and the site's location. The equipment 1310 at each site 1305, as shown in the user interface 1300, may include, for example, shelf, slot, and card identifying information. Each of the termination points 1315, including termination points 1325-1, 1325-2, 1325-3, 1325-4, 1325-5, and 1325-6, may have a corresponding port identifier for the associated equipment 1310. For example, termination point 1325-1 may include Port: 1A of the equipment at site "DFWJHGFKLHL," termination point 1325-2 may include Port: 7 of the equipment at site "ATLJHGFKLHL," etc. Multiple circuits, such as circuits 1330-1, 1330-2, and 1330-3, may further interconnect with NNI 1340. Circuit 1330-1 may be associated with a circuit ID "3P-X9R-TS4-0005," circuit 1330-2 may be associated with a circuit ID "401/T1ZF/HCKNNJ28W04/NBW-KNJNBKJ2," and circuit 1330-3 may be associated with a circuit ID "95/KEGS/031138/NE."

The consolidated view of the user interface 1300 of FIG. 13, thus, enables a showing of an end-to-end view (e.g., across the interconnected networks of network environment 1200 of FIG. 12) that has been stitched together from network element data obtained from the multiple network inventory/provisioning DBs 1-8. The end-to-end view of user interface 1300 includes the end termination points 1325-1 and 1325-6 that interconnect via NNI 1340, and other circuits and equipment termination points that also interconnect via NNI 1340. In some implementations, multiple NNIs may also be displayed in user interface 1300 with their interconnections, such that a complete network transport path between two end user devices utilizing multiple networks may be displayed.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A-11, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

What is claimed is:

1. A method, comprising:
   receiving, by a network device, a plurality of configuration management messages from a plurality of different network elements, wherein a first portion of the plurality of configuration management messages has a different data format than a second portion of the plurality of configuration management messages;
   translating, by the network device, the plurality of configuration management messages to a Common Network Data (CND) model format to produce a translated plurality of configuration management messages, wherein the translated plurality of configuration management messages, in the CND model format, each comprises a different graph further comprising multiple nodes, multiple properties, and multiple edges that inter-relate the multiple nodes and the multiple properties, wherein the multiple nodes, multiple properties, and multiple edges identify and inter-relate multiple configuration parameters of a respective one of the plurality of different network elements;
   storing the translated plurality of configuration management messages in a plurality of data structures, wherein each of the plurality of data structures corresponds to a respective different graph;
   receiving, by the network device, a query from a client device;
   performing, by the network device, a search of the plurality of data structures to identify stored configuration management messages that match the query; and
   sending the matching configuration management messages to the querying client device.

2. The method of claim 1, wherein receiving the plurality of configuration management messages further comprises:
   receiving a first configuration management message from a first network element, wherein the first configuration management message has a first data format, and
   receiving a second configuration management message from a second network element, wherein the second configuration management message has a second data format;
   wherein translating the plurality of configuration management messages further comprises:
   translating the first configuration management message from the first data format to the CND model format to produce a first translated message, and
   translating the second configuration management message from the second data format to the CND model format to produce a second translated message; and
   wherein storing the translated plurality of configuration management messages further comprises:
   storing the first translated message in a first data structure, and
   storing the second translated message in a second data structure.

3. The method of claim 2, wherein the first and second network elements are associated with transport of data across a network.

4. The method of claim 2, further comprising:
   forwarding, by the network device, the first translated message to a first destination; and
   forwarding, by the network device, the second translated message to a second destination.

5. The method of claim 1, wherein each of the multiple edges describe an association between different nodes of the multiple nodes, or an association between items of data stored in a same node of the multiple nodes.

6. A network device, comprising:
   a communication interface configured to:
      receive a plurality of configuration management messages from a plurality of different network elements, wherein a first portion of the plurality of configuration management messages has a different data format than a second portion of the plurality of configuration management messages; and
   one or more processing units configured to:
      translate the plurality of configuration management messages to a Common Network Data (CND) model format to produce a translated plurality of configuration management messages, wherein the translated plurality of configuration management messages each comprises a different graph further comprising multiple nodes, multiple properties, and multiple edges that inter-relate the multiple nodes and the multiple properties, wherein the multiple nodes, multiple properties, and multiple edges identify and inter-relate multiple configuration parameters of a respective one of the plurality of different network elements,
      store the translated plurality of configuration management messages in a plurality of data structures, wherein each of the plurality of data structures corresponds to a respective different graph,
      identify one or more network elements for anomaly detection,
      perform a search of the plurality of data structures to locate stored configuration management messages associated with the one or more network elements,
      analyze the located configuration management messages to identify at least one anomaly associated with at least one of the one or more network elements, and
      generate an anomaly report that includes the identified at least one anomaly.

7. The network device of claim 6, wherein, when receiving the plurality of configuration management messages, the communication interface is further configured to:
   receive a first configuration management message from a first network element, wherein the first configuration management message has a first data format, and
   receive a second configuration management message from a second network element, wherein the second configuration management message has a second data format; and
   wherein, when translating the plurality of configuration management messages, the one or more processing units are further configured to:
   translate the first configuration management message from the first data format to the CND model format to produce a first translated message, and
   translate the second configuration management message from the second data format to the CND model format to produce a second translated message, and wherein, when storing the translated plurality of configuration management messages, the one or more processing units are further configured to:
store the first translated message in a first data structure, and
store the second translated message in a second data structure.

8. The network device of claim 7, wherein the one or more processing units are further configured to:
forward, via the communication interface, the first translated message to a first destination; and
forward, via the communication interface, the second translated message to a second destination.

9. The network device of claim 6, wherein the communication interface is further configured to receive a query from a client device, and
wherein the one or more processing units are further configured to:
perform a search of the plurality of data structures to identify stored configuration management messages that match the query; and
send, via the communication interface, the matching configuration management messages to the querying client device.

10. The network device of claim 6, wherein the one or more processing units are further configured to:
identify a System of Record (SOR) that stores configuration management messages having a first data format;
perform a comparison of translated configuration management messages, stored in the plurality of data structures, with configuration management messages in the first data format currently stored in the SOR;
identify differences between the configuration management messages stored in the SOR and the plurality of data structures; and
correct configuration management message data stored in the SOR or the the plurality of data structures based on the identified differences.

11. The network device of claim 6, wherein each of the multiple edges describe an association between different nodes of the multiple nodes, or an association between items of data stored in a same node of the multiple nodes.

12. A non-transitory storage medium storing instructions executable by a network device, wherein the instructions comprise instructions to cause the network device to:
receive a plurality of configuration management messages from a plurality of different network elements, wherein a first portion of the plurality of configuration management messages has a different data format than a second portion of the plurality of configuration management messages;
translate the plurality of configuration management messages to a Common Network Data (CND) model format to produce a translated plurality of configuration management messages, wherein the translated plurality of configuration management messages each comprises a different graph further comprising multiple nodes, multiple properties, and multiple edges that inter-relate the multiple nodes and the multiple properties, wherein the multiple nodes, multiple properties, and multiple edges identify and inter-relate multiple configuration parameters of a respective one of the plurality of different network elements;
store the translated plurality of configuration management messages in a plurality of data structures, wherein each of the plurality of data structures corresponds to a respective different graph;
identify a System of Record (SOR) that stores configuration management messages having a first data format;
perform a comparison of translated configuration management messages, stored in the plurality of data structures, with configuration management messages in the first data format currently stored in the SOR;
identify differences between the configuration management messages stored in the SOR and the plurality of data structures; and
correct configuration management message data stored in the SOR or the plurality of data structures based on the identified differences.

13. The non-transitory storage medium of claim 12, wherein the instructions to cause the network device to receive the plurality of configuration management messages further comprise instructions to cause the network device to:
receive a first configuration management message from a first network element, wherein the first configuration management message has a first data format, and
receive a second configuration management message from a second network element, wherein the second configuration management message has a second data format;
wherein the instructions to cause the network device to translate the plurality of configuration management messages further comprise instructions to cause the network device to:
translate the first configuration management message from the first data format to the CND model format to produce a first translated message, and
translate the second configuration management message from the second data format to the CND model format to produce a second translated message; and
wherein the instructions to cause the network device to store the translated plurality of configuration management messages further comprise instructions to cause the network device to:
store the first translated message in a first data structure, and
store the second translated message a second data structure.

14. The non-transitory storage medium of claim 13, wherein the instructions comprise instructions to cause the network device to:
forward the first translated message to a first destination; and
forward the second translated message to a second destination.

15. The non-transitory storage medium of claim 1, wherein the first and second network elements are associated with transport of data across a network.

16. The non-transitory storage medium of claim 12, wherein each of the multiple edges describe an association between different nodes of the multiple nodes, or an association between items of data stored in a same node of the multiple nodes.

17. The non-transitory storage medium of claim 12, wherein the instructions comprise instructions to cause the network device to:
receive a query from a client device;
perform a search of the first data structure and the plurality of data structures to identify stored configuration management messages that match the query; and
send the matching configuration management messages to the querying client device.

18. The non-transitory storage medium of claim 12, wherein the instructions comprise instructions to cause the network device to:
  identify one or more network elements for anomaly detection;
  perform a search of the first data structure and the plurality of data structures to locate stored configuration management messages associated with the one or more network elements;
  analyze the located configuration management messages to identify at least one anomaly associated with at least one of the one or more network elements; and
  generate an anomaly report that describes the identified at least one anomaly.

19. A method, comprising:
  receiving, by a network device, a plurality of configuration management messages from a plurality of different network elements, wherein a first portion of the plurality of configuration management messages has a different data format than a second portion of the plurality of configuration management messages;
  translating, by the network device, the plurality of configuration management messages to a Common Network Data (CND) model format to produce a translated plurality of configuration management messages, wherein the translated plurality of configuration management messages each comprises a different graph further comprising multiple nodes, multiple properties, and multiple edges that inter-relate the multiple nodes and the multiple properties, wherein the multiple nodes, multiple properties, and multiple edges identify and inter-relate multiple configuration parameters of a respective one of the plurality of different network elements;
  storing the translated plurality of configuration management messages in a plurality of data structures, wherein each of the plurality of data structures corresponds to a respective different graph;
  identifying, by the network device, one or more network elements for anomaly detection;
  performing, by the network device, a search of the plurality of data structures to locate stored configuration management messages associated with the one or more network elements;
  analyzing, by the network device, the located configuration management messages to identify at least one anomaly associated with at least one of the one or more network elements; and
  generating an anomaly report that describes the identified at least one anomaly.

20. A method, comprising:
  receiving, by a network device, a plurality of configuration management messages from a plurality of different network elements, wherein a first portion of the plurality of configuration management messages has a different data format than a second portion of the plurality of configuration management messages;
  translating, by the network device, the plurality of configuration management messages to a Common Network Data (CND) model format to produce a translated plurality of configuration management messages, wherein the translated plurality of configuration management messages each comprises a different graph further comprising multiple nodes, multiple properties, and multiple edges that inter-relate the multiple nodes and the multiple properties, wherein the multiple nodes, multiple properties, and multiple edges identify and inter-relate multiple configuration parameters of a respective one of the plurality of different network elements;
  storing the translated plurality of configuration management messages in a plurality of data structures, wherein each of the plurality of data structures corresponds to a respective different graph;
  identifying, by the network device, a System of Record (SOR) that stores configuration management messages having a first data format;
  performing, by the network device, a comparison of translated configuration management messages, stored in the plurality of data structures, with configuration management messages in the first data format currently stored in the SOR;
  identifying differences between the configuration management messages stored in the SOR and the plurality of data structures; and
  correcting configuration management message data stored in the SOR or the plurality of data structures based on the identified differences.

* * * * *